United States Patent [19]
Kamimae et al.

[11] Patent Number: 5,697,634
[45] Date of Patent: Dec. 16, 1997

[54] SUSPENSION SYSTEM OF AUTOMOTIVE VEHICLE AND ELECTRIC CONTROL APPARATUS FOR THE SAME

[75] Inventors: Hajime Kamimae, Okazaki; Hideo Inoue, Ashigarakami-gun; Ichisei Kamimura, Okazaki; Satoru Ohsaku; Mitsunobu Hattori, both of Toyota; Yasuhiko Mishio, Gotenba; Hiroyoshi Kojima, Nishio, all of Japan

[73] Assignee: Toyota Jidosha Kabushiki Kaisha, Toyota, Japan

[21] Appl. No.: 641,658

[22] Filed: May 1, 1996

[30] Foreign Application Priority Data

May 1, 1995 [JP] Japan ................. 7-107591

[51] Int. Cl.$^6$ ................................. B60G 11/26
[52] U.S. Cl. ........................... 280/707; 280/714
[58] Field of Search ..................... 200/707, 714, 200/772

[56] References Cited

U.S. PATENT DOCUMENTS

| | | | |
|---|---|---|---|
| 5,149,131 | 9/1992 | Sugasawa et al. | 280/772 |
| 5,217,246 | 6/1993 | Williams et al. | 280/707 |
| 5,218,546 | 6/1993 | Bradshaw et al. | 280/707 |
| 5,383,679 | 1/1995 | Nakamura et al. | 280/707 |
| 5,393,087 | 2/1995 | Taniguchi et al. | 280/707 |
| 5,401,053 | 3/1995 | Sahm et al. | 280/707 |

FOREIGN PATENT DOCUMENTS

| | | |
|---|---|---|
| 4-358916 | 12/1992 | Japan . |
| 5-286326 | 11/1993 | Japan . |

*Primary Examiner*—Kenneth R. Rice
*Attorney, Agent, or Firm*—Kenyon & Kenyon

[57] ABSTRACT

A suspension system of an automotive vehicle including a spring disposed between an unsprung mass and a sprung mass for resiliently supporting thereon the sprung mass and a damping force generating mechanism arranged in parallel with the spring for absorbing vibration of the sprung mass relative to the unsprung mass, wherein the suspension system is provided with a spring element disposed in series with the damping force generating mechanism between the unsprung and sprung masses and an electrically operated control mechanism for controlling a spring coefficient of the spring element.

21 Claims, 26 Drawing Sheets

SUSPENSION SYSTEM OF AUTOMOTIVE VEHICLE AND ELECTRIC CONTROL APPARATUS FOR THE SAME

BACKGROUND OF THE INVENTION

1. Field of the Invention

The present invention relates to a suspension system of an automotive vehicle which includes a spring disposed between an unsprung mass and a sprung mass for resiliently supporting thereon the sprung mass and a damping force generating mechanism for absorbing vibration of the sprung mass relative to the unsprung mass and relates to an electric control apparatus for electrically controlling the suspension system in accordance with a condition of road surfaces, a driving condition of the vehicle, etc.

2. Description of the Prior Art

Illustrated in FIG. 34 is a conventional suspension system of an automotive vehicle of the type which includes a spring 14 disposed between an unsprung mass in the form of a lower arm 12 connected to a road wheel 11 and a sprung mass in the form of a vehicle body structure 13 for resiliently supporting the vehicle body structure 13 thereon and a damper device 15 including a damping force generating mechanism disposed in parallel with the spring 13 between the unsprung and sprung masses 12 and 13 for absorbing vibration of the sprung mass 13 caused by resilient support of the spring 14. The damper device 15 is connected to the sprung mass 13 through a bush 16 of an elastic material such as rubber.

Disclosed in Japanese Patent Laid-open Publication 5(1993)-286326 is a suspension system wherein the damping coefficient of a damper device 15 is electrically controlled by an electric control apparatus 17 as shown in FIG. 35. The electric control apparatus 17 is designed to detect vibration of a vehicle body structure 13 thereby to extract frequency components G1, G3 corresponding with each resonant frequency of the sprung and unsprung masses from the detected vibration (see FIG. 36) and to control the damping coefficient of the damper device 15 based on the frequency components G1, G3 for rapidly dampening vibration of the vehicle body structure 13 related to the resonant frequencies.

In the suspension system described above, a spring element 16a in the form of the bush 16 is arranged in series with the damping force generating mechanism in the damper device 15. Since the spring coefficient of the spring element 16a is fixed, the following problems will occur. In the case where the spring coefficient of the spring element 16a is set to a small value to enhance the riding comfort of the vehicle, the damping force of the damper device 15 may not be efficiently transmitted to the vehicle body structure. This results in deterioration of maneuverability of the vehicle and an increase of pitching and rolling of the vehicle body structure in acceleration, deceleration or turning of the vehicle. In the case where the spring coefficient of the spring element 16a is set to a large value, the damper device 15 acts to transmit a portion of the forces generated by road surfaces to the vehicle body structure during traveling of the vehicle on a rough road. This results in deterioration of the riding comfort of the vehicle.

SUMMARY OF THE INVENTION

It is, therefore, a primary object of the present invention to provide a suspension system of an automotive vehicle capable of enhancing the riding comfort of the vehicle without causing the problems discussed above.

Illustrated in FIGS. 1 and 2 is a solution theory of the present invention, wherein a spring element 18 the spring coefficient of which is variable is disposed in series with a damping force generating mechanism 15a between an unsprung mass 12 and a sprung mass 13, and wherein the spring coefficient of the spring element 18 is controlled by an electric control apparatus 17 to enhance the riding comfort of the vehicle under various traveling conditions.

According to the present invention based on the solution theory, there is provided a suspension system of an automotive vehicle including a spring disposed between an unsprung mass and a sprung mass for resiliently supporting thereon the sprung mass and a damping force generating mechanism arranged in parallel with the spring for absorbing vibration of the sprung mass relative to the unsprung mass, wherein the suspension system comprises resilient means disposed in series with the damping force generating mechanism between the unsprung and sprung masses and an electrically operated control mechanism for controlling a spring coefficient of said resilient means.

According to an aspect of the present invention, there is provided a suspension system of an automotive vehicle including a spring disposed between an unsprung mass and a sprung mass for resiliently supporting thereon the sprung mass, a damper device including a damping force generating mechanism composed of a hydraulic cylinder mounted on the unsprung mass, a piston disposed within the cylinder to subdivide the interior of the cylinder into upper and lower fluid chambers, a piston rod connected at its lower end to the piston and extending upwards from an upper end of the cylinder, and valve means assembled with the piston to control the flow of hydraulic fluid between the upper and lower fluid chambers in response to movement of the piston, wherein the suspension system comprises a plurality of springs disposed between an upper end of the piston rod and the sprung mass and arranged in series with the damping force generating mechanism of the damper device, and an electrically operated control mechanism for selectively effecting spring action of said plurality of springs.

According to another aspect of the present invention, there is provided a suspension system of an automotive vehicle including a spring disposed between an unsprung mass and a sprung mass for resiliently supporting thereon the sprung mass and a damper device including a damping force generating mechanism composed of a hydraulic cylinder mounted on the unsprung mass, a piston disposed within the cylinder to subdivide the interior of the cylinder into upper and lower fluid chambers, a piston rod connected at its lower end to the piston and extending upwards from an upper end of the cylinder, and valve means assembled with the piston to control the flow of hydraulic fluid between the upper and lower fluid chambers in response to movement of the piston, wherein the suspension system comprises a resilient block member disposed between an upper end of the piston rod and the sprung mass, the resilient block member being formed with an internal cavity to be supplied with hydraulic fluid, and an electrically operated control mechanism for controlling an amount of hydraulic fluid supplied into the internal cavity of the resilient block member.

According to a further aspect of the present invention, there is provided a suspension system of an automotive vehicle including a spring disposed between an unsprung mass and a sprung mass for resiliently supporting thereon the sprung mass and a damper device including a damping force generating mechanism composed of a hydraulic cylinder mounted on the unsprung mass, a piston disposed within the cylinder to subdivide the interior of the cylinder into upper and lower fluid chambers, a piston rod connected at its lower end to the piston and extending upwards from an upper end of the cylinder, and valve means assembled with the piston to control the flow of hydraulic fluid between the upper and lower fluid chambers in response to movement of the piston, wherein the suspension system comprises means for introducing the atmospheric air into the hydraulic fluid stored in the hydraulic cylinder and an electrically operated control mechanism for controlling an amount of the air introduced into the hydraulic fluid in the cylinder.

According to another aspect of the present invention, there is provided a suspension system of an automotive vehicle including a spring disposed between an unsprung mass and a sprung mass for resiliently supporting thereon the sprung mass, a damper device including a damping force generating mechanism composed of a hydraulic cylinder mounted on the unsprung mass, a piston disposed within the cylinder to subdivide the interior of the cylinder into upper and lower fluid chambers, a piston rod connected at its lower end to the piston and extending upwards from an upper end of the cylinder and valve means assembled with the piston to control the flow of hydraulic fluid between the upper and lower fluid chambers in response to movement of the piston and including a free piston disposed within a lower end portion of the cylinder to form a gas chamber isolated from the lower fluid chamber in a liquid-tight manner, wherein the suspension system comprises an electrically operated control mechanism arranged to control the pressure of a gaseous medium introduced into and discharged from the gas chamber of the damper device.

According to an aspect of the present invention, there is provided an electric control apparatus for a suspension system including a spring disposed between an unsprung mass and a sprung mass for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, and an electrically operated control mechanism for controlling a spring coefficient of the resilient means, wherein the electric control apparatus comprises detection means for detecting damping action of the damping force generating mechanism and for producing an electric signal indicative of the damping action, and control means responsive to the electric signal from the detection means for controlling the electrically operated control mechanism in such a manner that the spring coefficient of the resilient means is increased in response to the damping action of the damping force generating mechanism.

According to a further aspect of the present invention, there is provided an electric control apparatus for a suspension system of an automotive vehicle including a spring disposed between an unsprung mass and a sprung mass for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, and an electrically operated control mechanism for controlling a spring coefficient of the resilient means, wherein the electric control apparatus comprises detection means for detecting vibration of the sprung mass and for producing an electric signal indicative of the magnitude of vibration of the sprung mass, and control means responsive to the electric signal from the detection means for controlling the electrically operated control mechanism in such a manner that the spring coefficient of the resilient means is increased in accordance with an increase of the vibration of the sprung mass.

According to another aspect of the present invention, there is provided an electric control apparatus for a suspension system of an automotive vehicle including a spring disposed between an unsprung mass and a sprung mass for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, and an electrically operated control mechanism for controlling a spring coefficient of the resilient means, wherein the electric control system comprises detection means for detecting driving operation of the vehicle during which an attitude of the sprung mass is changed and for producing an electric signal indicative of the detected driving operation of the vehicle, and control means responsive to the electric signal from the detection means for controlling the electrically operated control mechanism in such a manner that the spring coefficient of the resilient means is increased in response to the driving operation of the vehicle.

According to a still another aspect of the present invention, there is provided an electric control apparatus for a suspension system of an automotive vehicle including a spring disposed between an unsprung mass and a sprung mass for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, and an electrically operated control mechanism for controlling a spring coefficient of the resilient means, wherein the electric control apparatus comprises detection means for detecting a traveling speed of the vehicle and for producing an electric signal indicative of the detected traveling speed, and control means responsive to the electric signal from the detection means for controlling the electrically operated control mechanism in such a manner that the spring coefficient is increased in accordance with an increase of the traveling speed.

According to a further aspect of the present invention, there is provided an electric control apparatus for a suspension system of an automotive vehicle including a spring disposed between an unsprung mass and a sprung mass for resiliently supporting the sprung mass thereon, a damping force generating mechanism arranged in parallel with the spring for absorbing vibration of the sprung mass relative to the unsprung mass, resilient means disposed in series with the damping force generating mechanism between the unsprung and sprung masses, and an electrically operated control mechanism for controlling a spring coefficient of the resilient means, wherein the electric control apparatus comprises means for producing a control signal indicative of a target spring coefficient and for applying the control signal to the electrically operated control mechanism thereby to set the spring coefficient of the resilient means to the target spring coefficient, detection means for detecting a vibration component of the sprung mass distributed between resonant frequencies of the sprung and unsprung masses and for producing an electric signal indicative of the detected vibration component, and restriction means responsive to the electric signal from the detection means for restricting the target spring coefficient to a small value when the detected vibration component is large.

According to an aspect of the present invention, there is provided an electric control apparatus for a suspension system of an automotive vehicle including a spring disposed between an unsprung mass and a sprung mass for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, and an electrically operated control mechanism for controlling a spring coefficient of the resilient means, wherein the electric control apparatus comprises means for applying a changeover signal to the electrically operated control mechanism, detection means for detecting a relative vertical displacement velocity of the sprung mass to the unsprung mass and for producing an electric signal indicative of the detected relative vertical displacement velocity, and means responsive to the electric signal from the detection means for applying a changeover signal to the electrically operated control mechanism when the detected relative vertical displacement velocity has become approximately zero.

According to a further aspect of the present invention, there is provided an electric control apparatus for a suspension system of an automotive vehicle including a spring disposed between an unsprung mass and a sprung mass for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, and an electrically operated control mechanism for controlling a spring coefficient of the resilient means, wherein the electric control apparatus comprises control means for controlling the electrically operated control mechanism in such a manner that the spring coefficient of the resilient means is gradually switched over.

According to another aspect of the present invention, there is provided an electric control apparatus for a suspension system of an automotive vehicle including a spring disposed between an unsprung mass and a sprung mass for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, an electrically operated damping force control mechanism for controlling a damping coefficient of the damping force generating mechanism; and an electrically operated spring coefficient control mechanism for controlling a spring coefficient of the resilient means, wherein the electric control apparatus comprises first detection means for detecting vibration of the sprung mass; second detection means for detecting vibration of the sprung mass in a specific frequency region; first control means for controlling the electrically operated damping force control mechanism in such a manner that the damping coefficient is increased in accordance with an increase of the vibration of the sprung mass detected by the first detection means; and second control means for controlling the electrically operated spring coefficient control mechanism in such a manner that the spring coefficient of the resilient means is increased in accordance with an increase of the vibration of the sprung mass detected by the second detection means.

According to a still another aspect of the present invention, there is provided an electric control apparatus for a suspension system of an automotive vehicle including a spring disposed between an unsprung mass and a sprung mass, for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, an electrically operated damping force control mechanism for controlling a damping coefficient of the damping force generating mechanism, and an electrically operated spring coefficient control mechanism for controlling a spring coefficient of the resilient means, wherein the electric control apparatus comprises a sensor for detecting vibration of the sprung mass; first control means for controlling the damping force control mechanism in such a manner that the damping coefficient of the damping force generating mechanism is increased in accordance with an increase of a vibration component of the sprung mass detected by the sensor in a low frequency region and that the damping coefficient is decreased in accordance with a decrease of the vibration component; and second control means for controlling the spring coefficient control mechanism in such a manner that the spring coefficient of the resilient means is increased in accordance with an increase of vibration of the sprung mass detected by the sensor in a specific frequency region and that the spring coefficient of the resilient means is decreased in another condition.

According to a further aspect of the present invention, there is provided an electric control apparatus for a suspension system of an automotive vehicle including a spring disposed between an unsprung mass and a sprung mass for resiliently supporting thereon the sprung mass, a damping force generating mechanism arranged in parallel with the spring for absorbing vibration of the sprung mass relative to the unsprung mass, resilient means disposed in series with the damping force generating mechanism between the unsprung and sprung masses, an electrically operated damping force control mechanism for controlling a damping coefficient of the damping force generating mechanism, and an electrically operated spring coefficient control mechanism for controlling a spring coefficient of the resilient means, wherein the electric control apparatus comprises detection means for detecting vibration of the sprung mass; first control means for controlling the damping force control mechanism in such a manner that when a vibration component corresponding with a resonant frequency of the sprung mass is large, the damping coefficient of the damping force generating mechanism is set as a first value to be increased in accordance with an increase of vibration of the sprung mass, that when a vibration component corresponding with a resonant frequency of the unsprung mass is large, the damping coefficient of the damping force generating mechanism is set in a second small value, and that when a vibration component corresponding with each resonant frequency of the unsprung and sprung masses is small, the damping coefficient is set to a third value smaller than the second small value; and second control means for controlling the spring coefficient control mechanism in such a manner that the spring coefficient of the resilient means is increased in accordance with an increase of vibration of the sprung mass corresponding with each resonant frequency of the sprung and unsprung masses.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF PREFERRED EMBODIMENTS

Figure 1:
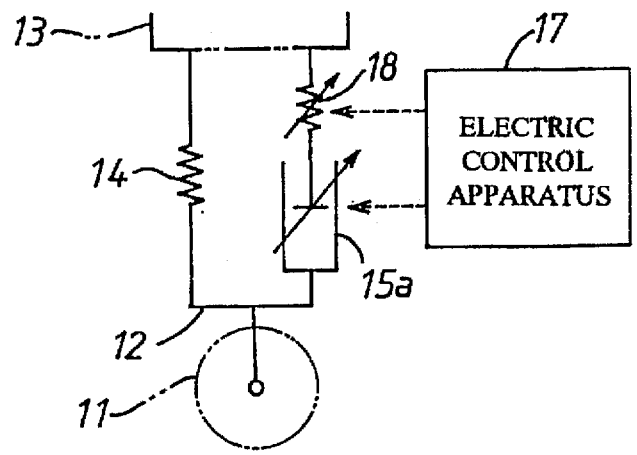
FIG. 1 is a first conceptual view for explanation of a solution theory of the present invention.
Figure 2:
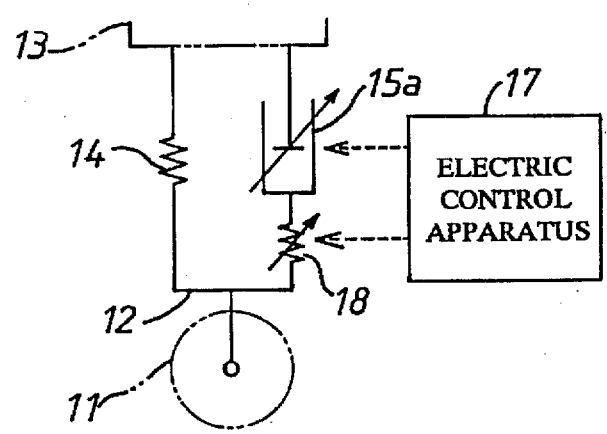
FIG. 2 is a second conceptual view for explanation of the solution theory of the present invention.
Figure 3:
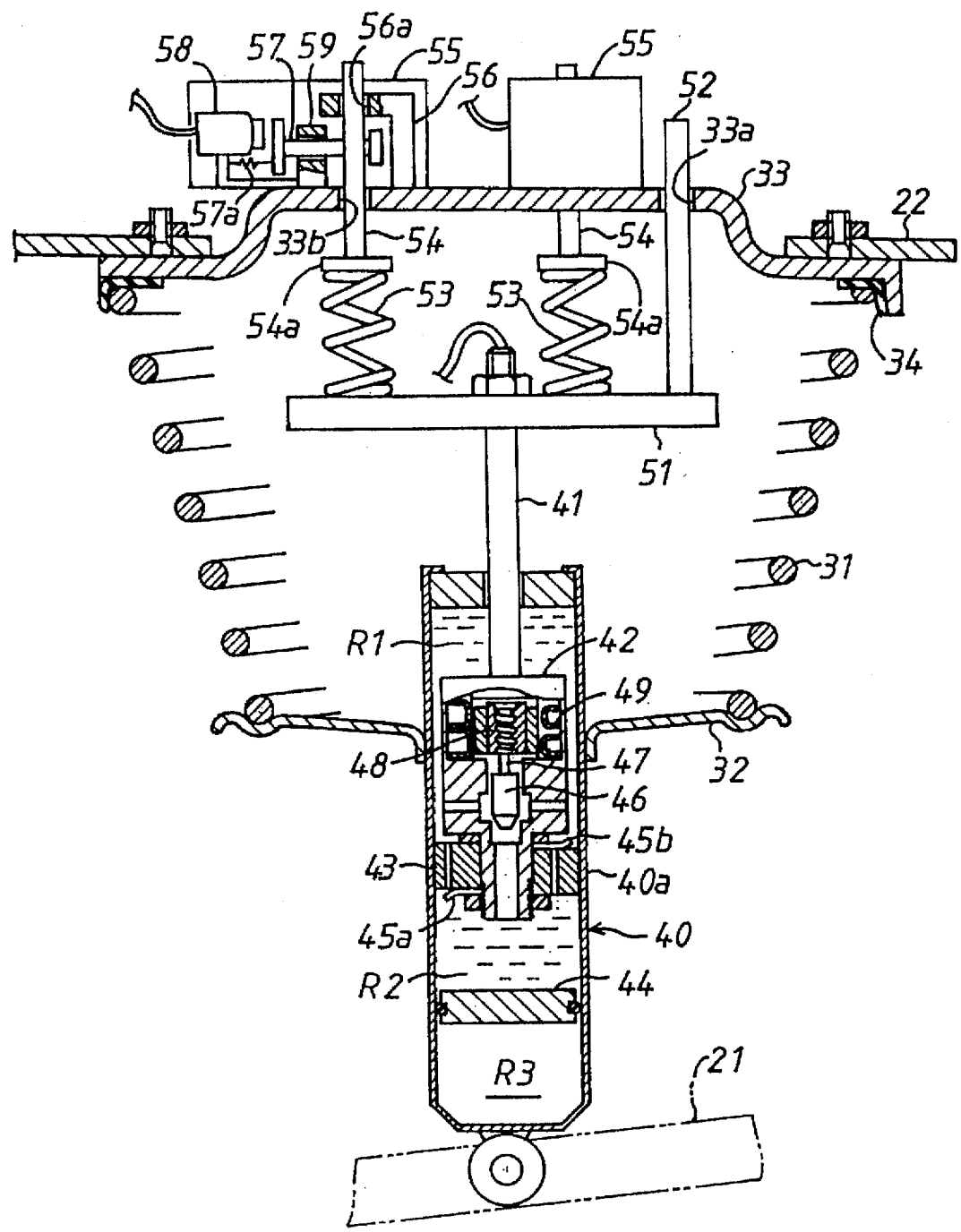
FIG. 3 is a vertical sectional view of a first embodiment of a suspension system in accordance with the present invention.

Illustrated in FIG. 3 of the drawings is a first embodiment of a suspension system according to the present invention which includes a spiral coil spring 31 and a damper device 40 coaxially disposed between an unsprung mass in the form of a lower arm 21 connected to a road wheel (not shown) and a sprung mass in the form of a vehicle body structure 22. The spiral coil spring 31 is carried by a retainer 32 fixed to a cylinder 40a of the damper device 40 and engaged at its upper end with a stationary plate 33 fixed to the vehicle body structure 22 through an annular bush 34 to resiliently support the vehicle body structure 22.

Figure 4:
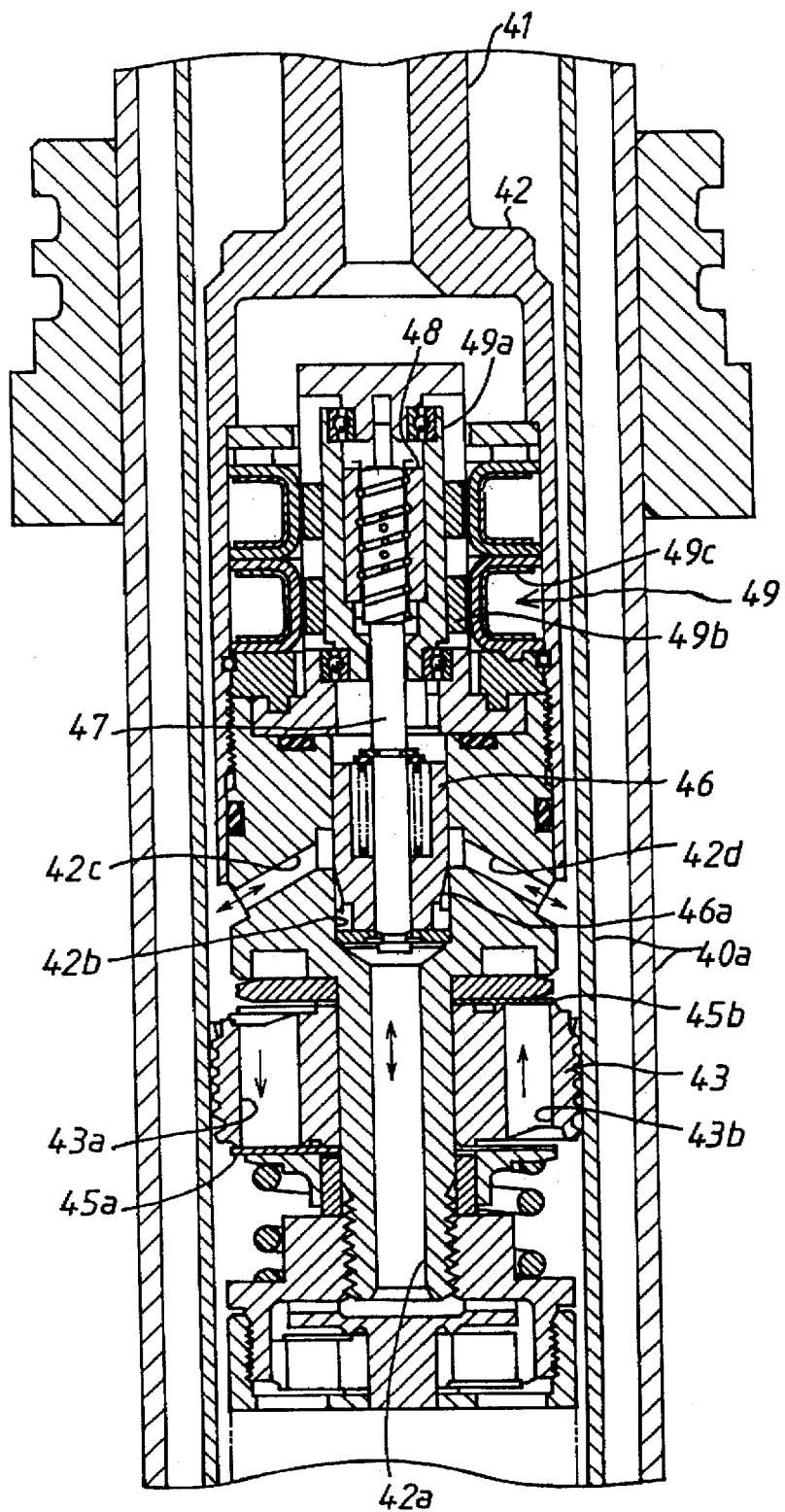
FIG. 4 is a partly enlarged sectional view of the suspension system shown in FIG. 5.

As shown in FIGS. 3 and 4, the cylinder 40a of damper device 40 is pivoted at its lower end to the lower arm 21. A piston rod 41 extending upwards from the cylinder 40a is integrally formed with a cylindrical casing 42 which contains a stepped support block threaded therein. A piston 43 is connected to a small diameter portion of the support block to subdivide the interior of cylinder 40a into upper and lower fluid chambers R1 and R2 filled with hydraulic fluid. The upper fluid chamber R1 is communicated with the lower fluid chamber R2 through fluid passages 43a and 43b formed in the piston 43 under control of relief valves 45a and 45b and through fluid passages 42a, 42b, 42c, 42d under control of a variable throttle valve described later. A free piston 44 is axially movably disposed within a lower end portion of cylinder 40a to close the lower fluid chamber R2 in a liquid-tight manner and to form a gas chamber R3 for absorbing a volume change of the fluid chambers R1, R2 caused by movement of the free piston 44.

The relief valve 45a is assembled with the piston 43 at the lower end of fluid passage 43a to permit flow of hydraulic fluid from the upper fluid chamber R1 into the lower fluid chamber R2 only when the piston 43 is moved upward. The relief valve 45b is assembled with the piston 43 at the upper end of fluid passage 43b to permit flow of fluid from the lower fluid chamber R2 into the upper fluid chamber R1 only when the piston 43 is moved downward. The fluid passages 42a and 42b are formed by an axial stepped bore in the support block, while the fluid passages 42c and 42d are formed by radial holes in the support block. Axially slidably disposed within the fluid passage 42b is a valve spool 46 formed with a tapered portion 46a which is cooperable with a peripheral surface of the fluid passage 42b to provide the variable throttle valve between the fluid passages 42b and 42c, 42d for controlling a throttle amount of hydraulic fluid flowing therethrough in accordance with movement of the valve spool 46. In the damper device 40 described above, a damping force is generated by passage resistance of the hydraulic fluid flowing through the relief valves 45a, 45b and throttle valve, and a damping coefficient of the damping device is changed by variation of the throttle amount of hydraulic fluid at the throttle valve.

The valve spool 46 is fixed to a moving rod 47 the upper end of which is connected with a ball nut 48 through a number of balls. The ball nut 48 is driven by an electric actuator in the form of a step motor 49 to cause axial movement of the moving rod 47 and valve spool 46. The step motor 49 includes a rotor 49a fixed at its internal surface to the ball nut 48, a plurality of circumferentially equally spaced permanent magnets 49b fixed to the outer periphery of rotor 49a and a plurality of windings 49c arranged in surrounding relationship with the permanent magnets 49b.

In the damper device 40, the step motor 49 is activated under control of electric power applied thereto to control axial movement of the moving rod 47 in accordance with rotation of the rotor 49. Thus, the valve spool 46 is moved by axial movement of the moving rod 47 to control the throttle amount of hydraulic fluid between the passages 42b and 42c, 42d for switching over the damping coefficient of the damper device at multiple steps. The piston rod 41 is connected at its upper end to a movable plate 51 which is arranged in parallel with the stationary plate 33 secured to the sprung mass of the vehicle. The movable plate 51 is provided thereon with a plurality of circumferentially equally spaced vertical rods 52 which are guided by the corresponding through holes 33a in the stationary plate 33 for permitting vertical movements of the movable plate 51 in parallel with the stationary plate 33. The movable plate 51 is further provided thereon with a plurality of circumferentially equally spaced coil springs 53 each spring coefficient "k" of which is the same. The coil springs 53 each are fixed at their upper ends to stopper plates 54a which are connected to control rods 54 respectively. The control rods 54 are extended upwards through the corresponding through holes 33b in the stationary through holes 33b for vertical movement.

The control rods 54 each are further extended upwards through the corresponding casings 55 which are fixedly mounted on the stationary plate 33. The casings 55 each are formed to contain an L-letter shaped frame 56 fixed to the stationary plate 33. The frame 56 has a horizontal arm portion formed with a through hole 56a for permitting vertical movements of the control rod 54. The casing 55 is provided therein with a clutch bar 57 engaged with the control rod 54 for pulling the control rod 54 in a lateral direction and an electromagnetic solenoid 58. The clutch bar 57 is laterally movably supported on a support frame 59 fixedly mounted on the stationary plate 33 and is engaged at its distal hook end with an intermediate portion of the control rod 54. The clutch bar 57 is normally loaded by a spring 57a to be disengaged from the control rod 54. The spring 57a is connected at its one end with the clutch bar 57 and at its other end with the casing 55. The electromagnetic solenoid 58 is fixed to the casing 55 to cause outward movement of the clutch bar 57 when it has been energized. In a condition where the electromagnetic solenoid 58 is being deenergized, the clutch bar 57 is disengaged from the control rod 54 under the biasing force of spring 57a to permit vertical movement of the control rod 54 until the stopper plate 54a is brought into engagement with the stationary plate 33. In such a condition, the spring coefficient of the coil spring 53 is defined as "0".

When the electromagnetic solenoid 58 is energized, the clutch bar 57 is moved by attraction force of the solenoid 58 against the spring 57a and engaged with the control rod 54 to cause engagement of the control rod 54 with the stationary plate 33 and frame 56 at their through holes 33b, 56a. In such a condition, the control rod 54 is retained in position so that the spring coefficient of coil spring 53 is defined by a predetermined value "k".

In such a manner as described above, the electromagnetic solenoids 58 corresponding with the number "n" of coil springs 53 are selectively energized or deenergized to selectively effect each action of the coil springs 53. Assuming that the number "m" (m<n) of electromagnetic solenoids 58 are energized, the number "m" of coil springs 53 act as a spring element of a spring coefficient "mk" disposed between the movable plate 51 of the damper device and the vehicle body structure 22. Thus, in the suspension system, the spring coefficients of the coil springs 53 disposed between the damper device 40 and the vehicle body structure 22 can be adjusted to either one of 0, k, 1k . . . nk under control of the electromagnetic solenoids 58. Although in this embodiment, all the spring coefficients of the number "n" of coil springs 53 have been set to the same value, the spring coefficients of coil springs 53 may be set to various different values.

As is understood from the above description, the plural coil springs 53 in the suspension system are provided in series with the damping force generating mechanism in the damper device 40 between the unsprung and sprung masses 21 and 22, and a spring coefficient control mechanism composed of the clutch bar 57 and electromagnetic solenoid 58 is provided to electrically control each spring coefficient of the coil springs 53. With the suspension system, the spring coefficients of coil springs 53 can be controlled during traveling of the vehicle to maintain the riding comfort of the vehicle in a good condition. Since in the suspension system, the coil springs 53 are disposed between the damping force generating mechanism in the damper device 40 and the vehicle body structure 22, the forces acting on the vehicle body structure from road surfaces can be reduced. In other words, the arrangement of the spring elements at the sprung mass side is effective to reduce the mass of the unsprung member directly applied with an input from road surfaces. This means that accumulation of vibration energy caused by forces generated by road surfaces is reduced. Although in this embodiment, the coil springs 53 have been used as the spring elements, a leaf spring or other spring may be used as the spring elements. Alternatively, a resilient member such as rubber including various springs may be used as the spring elements.

Figure 5:
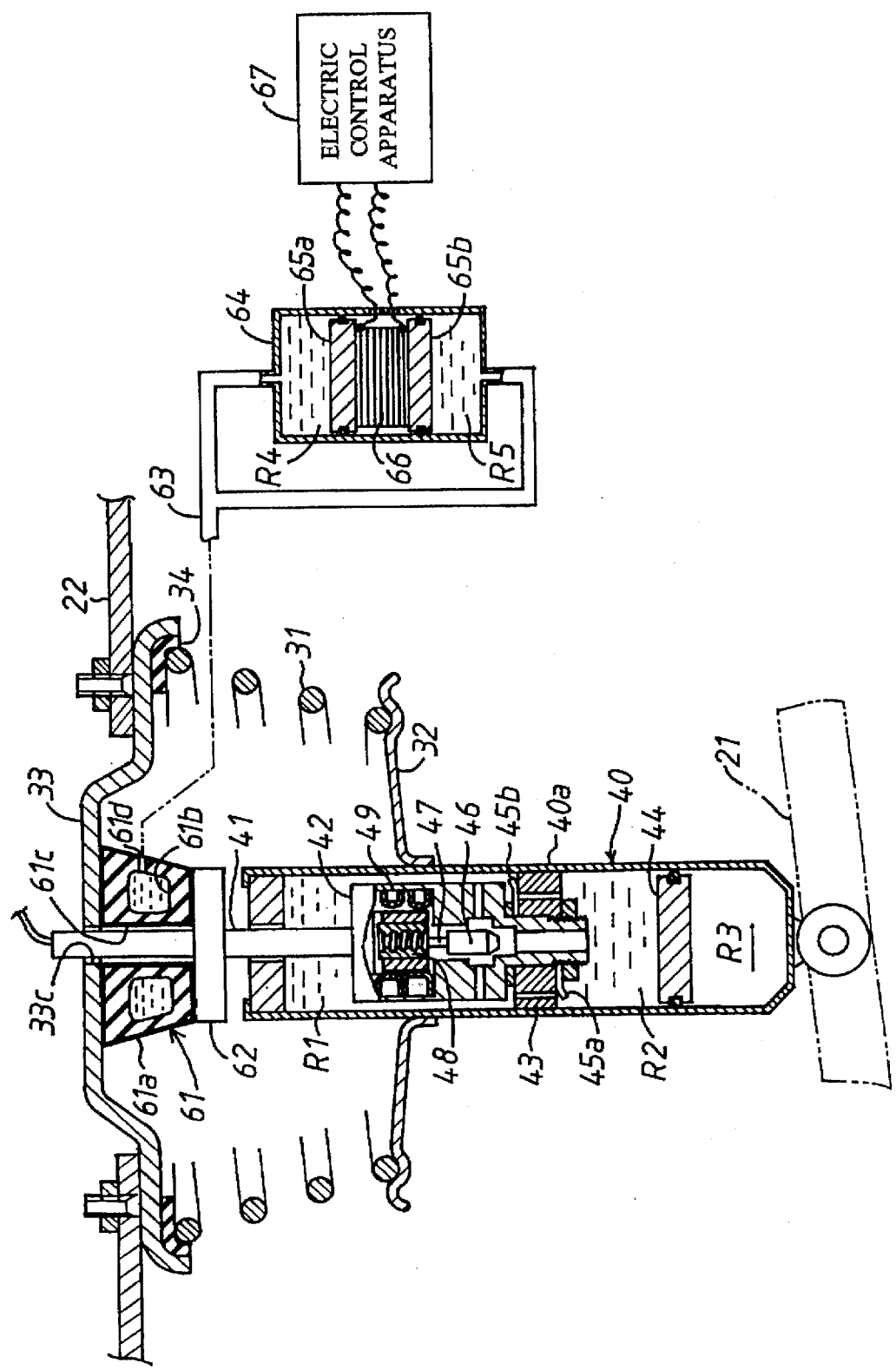
FIG. 5 is a vertical sectional view of a first modification of the suspension system in accordance with the present invention.

Illustrated in FIG. 5 is a first modification of the suspension system according to the present invention in which the coil spring 31 and the damper device 40 are provided in the same manner as in the preferred embodiment. The first modification is characterized in that a spring element in the form of a resilient block member 61 is disposed between the damper device 40 and the stationary plate 33 secured to the vehicle body structure 22. The resilient block member 61 is in the form of an annular block member made of a rubber material and covered with a surface layer 61a of elastic synthetic resin to form therein an annular cavity 61b filled with hydraulic fluid. The resilient block member 61 is fixedly mounted on a movable plate 62 fixed to an intermediate portion of the piston rod 41 and is secured to the bottom of stationary plate 33 at its upper surface. The piston rod 41 is extended upward from the movable plate 62 through holes 61c, 33c respectively formed in the resilient block member 61 and stationary plate 33 for permitting vertical movement of the damper device 40.

The resilient block member 61 is formed with an inlet-outlet port 61d in open communication with the internal annular cavity 61b, and the inlet-outlet port 61d is communicated with fluid chambers R4, R5 in a cylinder 64 through a conduit 63. The cylinder 64 includes a pair of pistons 65a and 65b slidably provided therein in a liquid-tight manner. Disposed between the pistons 65a and 65b is a piezoelectric actuator 66 which is composed of multi-layered piezoelectric elements. The thickness of the piezoelectric actuator 66 is varied in response to a voltage signal applied thereto from an electric control apparatus 67 to effect vertical displacement of the pistons 65a, 65b. The cylinder 64 and electric control apparatus 67 are mounted on an appropriate place of the vehicle body structure 22.

Assuming that the piezoelectric actuator 66 is applied with a control voltage from the electric control apparatus 67, the thickness of the piezoelectric actuator 66 increases in accordance with an increase of the control voltage to effect vertical displacement of the pistons 65a, 65b. As a result the hydraulic fluid from fluid chambers R4, R5 is supplied into the internal cavity 61b of resilient block member 61 to compress the resilient block member 61. Thus, the spring coefficient of the resilient block member 61 is varied in accordance with the magnitude of the control voltage. In addition the step motor 49 of the damper device 40 is activated under control of the electric control apparatus 67 to switch over the damping coefficient of the damper device 40.

In the second embodiment of the suspension system described above, the spring element in the form of the resilient block member 61 is disposed between the unsprung and sprung masses 21 and 22 in series with the damping force generating mechanism composed of the piston 43, relief valves 45a, 45b and variable throttle valve. In addition a spring coefficient control mechanism composed of the cylinder 64, pistons 65a, 65b and piezoelectric actuator 60 is provided to electrically control the spring coefficient of the resilient block member 61 under control of the hydraulic fluid supplied thereto. With the suspension system, the spring coefficient of the spring element connected in series with the damper device 40 is varied in a simple manner during traveling of the vehicle.

Figure 6:
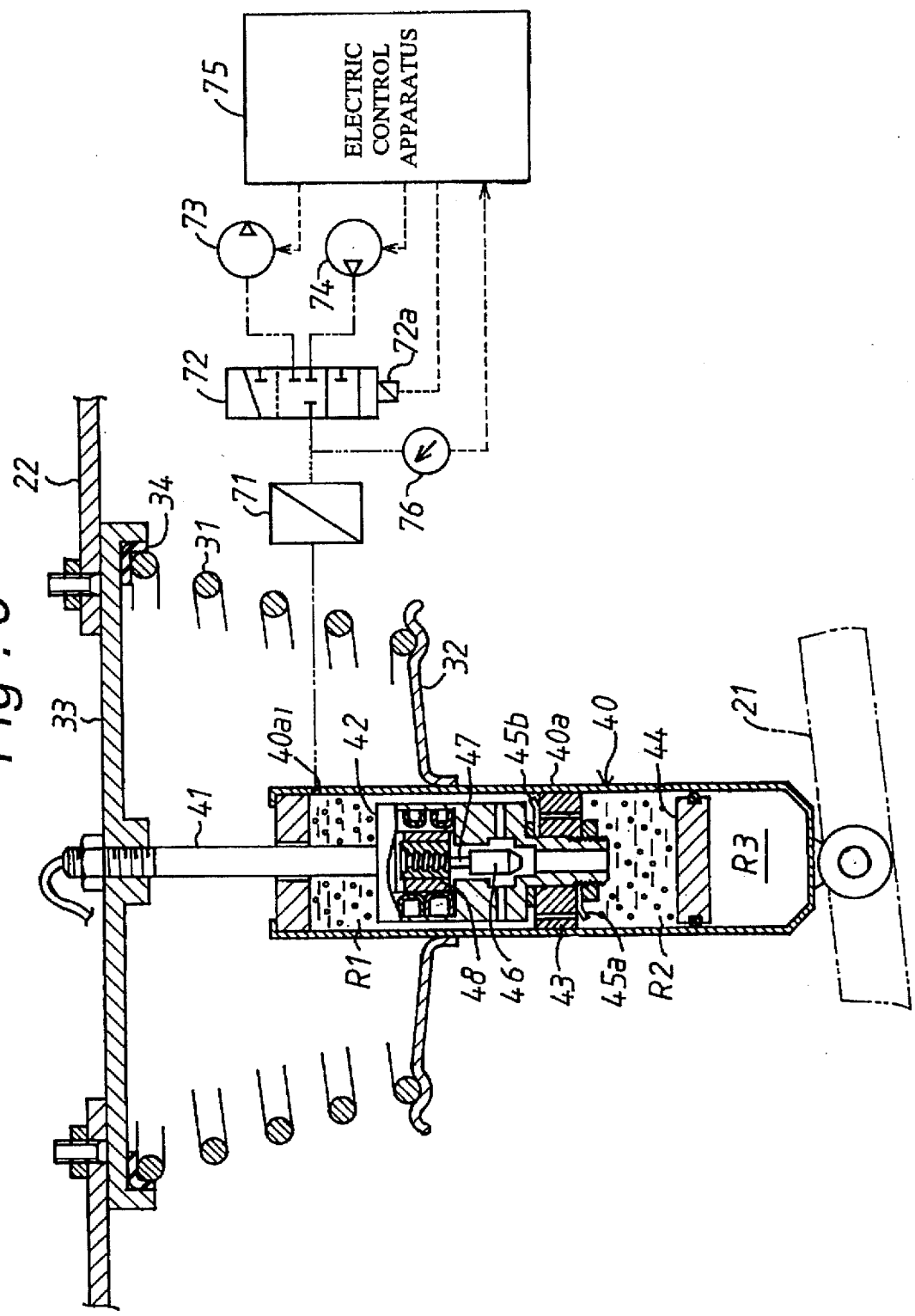
FIG. 6 is a vertical sectional view of a second modification of the suspension system in accordance with the present invention.

Illustrated in FIG. 6 is a second modification of the suspension system according to the present invention which includes the coil spring 31 and the damper device 40 arranged in the same manner as in the preferred embodiment. The second modification is characterized in that hydraulic fluid stored in the cylinder 40a of the damper device 40 is adapted to act as a spring element and that the piston rod 41 of the damper device 40 is fixed to the stationary plate 33 secured to the vehicle body structure.

In the damper device 40, the cylinder 40a is provided at its upper portion with an inlet-outlet port 40a1 through which the atmospheric air is introduced into the upper fluid chamber R1 of cylinder 40a to be mixed with the hydraulic fluid as fine air particles. Since the hydraulic fluid in the cylinder 40a does not change in volume, the spring coefficient of the hydraulic fluid is increased or decreased in accordance with an amount of the air introduced into the upper fluid chamber R1. The inlet-outlet port 40a1 is connected to a pair of pneumatic pumps 73, 74 through a filter 71 and a three-way valve 72. The filter 71 is designed to interrupt the hydraulic fluid passing therethrough and to permit only the air passing therethrough. The three-way valve 72 is provided with an electromagnetic solenoid 72a which is energized under control of an electric control apparatus 75 to switch over the three-way valve 72. To control an amount of the air dissolved in the hydraulic fluid in the cylinder 40a, a pressure sensor 76 is disposed between the three-way valve 72 and the filter 71 to detect the pressure of air introduced into the upper fluid chamber R1 for applying an electric signal indicative of the detected pressure to the electric control apparatus 75. The filter 71, three-way valve 72, pneumatic pumps 73, 74, electric control apparatus 75 and pressure sensor 76 are mounted on an appropriate place of the vehicle body structure 22.

Assuming that the electromagnetic solenoid 72a has been energized under control of the electric control apparatus 75 to set the three-way valve 72 in a first or lower position and that the pneumatic pump 74 has been operated under control of the electric control apparatus 75, the atmospheric air is introduced into the cylinder 40a through the three-way valve 72 and filter 71. In such an instance, the spring coefficient of the hydraulic fluid is decreased in accordance with an increase of the amount of air dissolved in the hydraulic fluid, and in turn, the pressure sensor 76 applies a detection signal to the electric control apparatus 75 when it is detected that the spring coefficient of the hydraulic fluid has become a predetermined value. When applied with the detection signal, the electric control apparatus 75 energizes the solenoid 72 to switch over the three-way valve 72 to a second or intermediate position and deactivates the pneumatic pump 74. As a result, the introduction of the air into the cylinder 40a is blocked to maintain the spring coefficient of hydraulic fluid at the predetermined value.

Assuming that the three-way valve 72 has been set in a third or upper position under control of the electric control apparatus 72 and that the pneumatic pump 73 has been activated under control of the electric control apparatus 72, only the air is discharged from the cylinder 48a through the filter 71 and the three-way valve 72. In such an instance, the spring coefficient of hydraulic fluid is increased in accordance with the discharge amount of the air, and in turn, the electric control apparatus 75 cooperates with the pressure sensor 76 to switch over the three-way valve 72 to the second position when the spring coefficient of hydraulic fluid has become a desired value and deactivates the pneumatic pump 73. As a result, the discharge of the air is blocked to maintain the spring coefficient of hydraulic fluid at the desired value. During the foregoing operation, the step motor 49 of the damper device 40 is operated under control of the electric control apparatus 75 to control damping action of the damper device 40. In the suspension system of the this modification, the hydraulic fluid in the cylinder 40a to be applied with the air is adapted as a spring element arranged between the unsprung and sprung masses 21 and 22 in series with the damping force generating mechanism composed of the piston 43, relief valves 45a, 45b and variable throttle valve in the damper device 40, and a spring coefficient control mechanism is composed of the filter 71, three-way valve 72, pneumatic pumps 73, 74 to electrically adjust the spring coefficient of the hydraulic fluid under control of the air introduced into the cylinder 40a. With the suspension system, the spring coefficient of the spring element in series with the damper device 40 can be varied in a simple manner during traveling of the vehicle.

Figure 7:
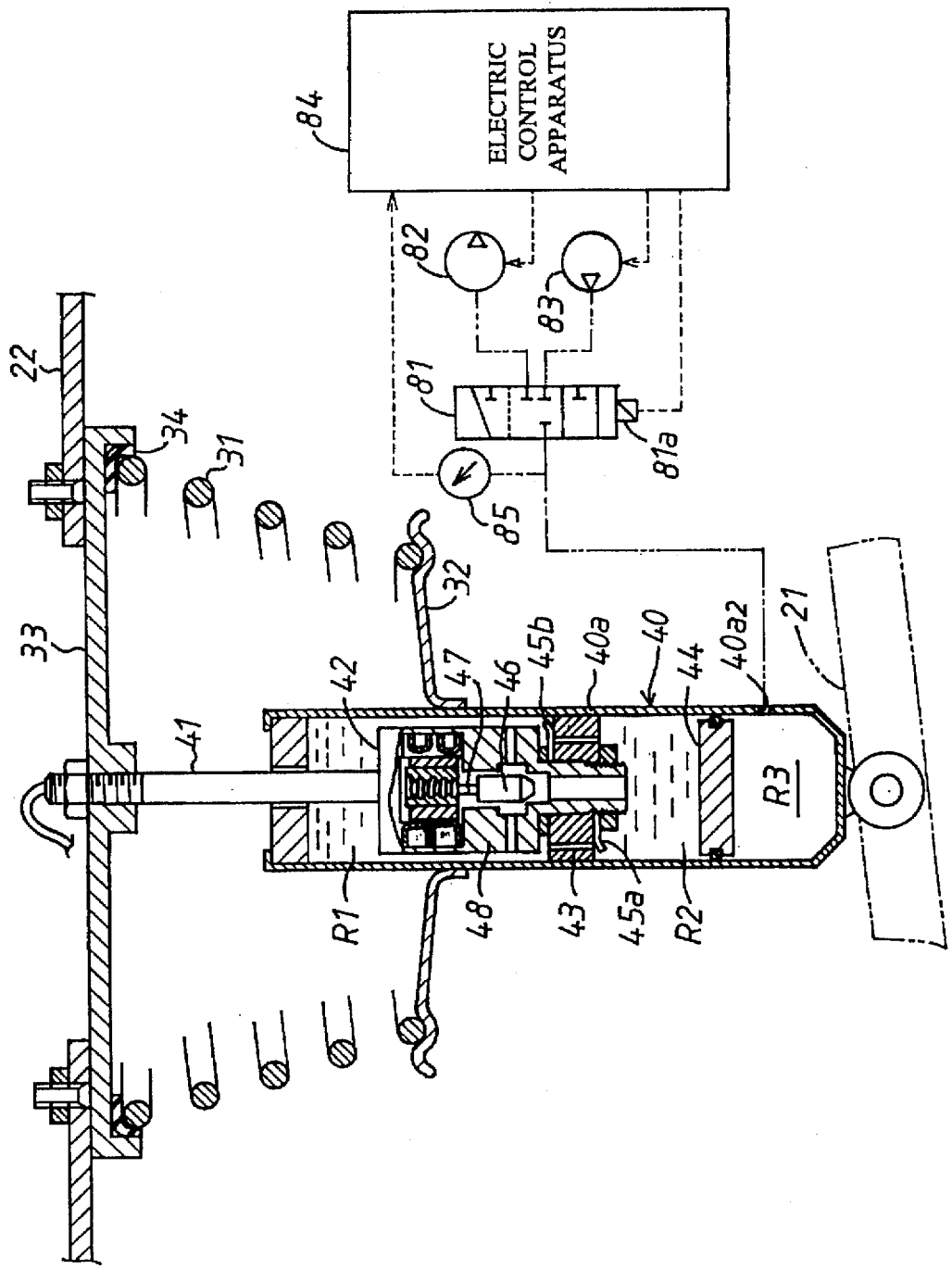
FIG. 7 is a vertical sectional view of a third modification of the suspension system in accordance with the present invention.

Illustrated in FIG. 7 is a third modification of the suspension system according to the present invention wherein the spring 31 and damper device 40 are assembled in the same manner as in the preferred embodiment. The third modification is characterized in that the air in the gas chamber R3 of the cylinder 40a acts as a spring element. In this modification, the piston rod 41 is fixed at its upper end to the stationary plate 33 secured to the vehicle body structure 22. The gas chamber R3 of the cylinder 40a is provided in its peripheral wall with an inlet-outlet port 40a2 through which the air is introduced into or discharged from the gas chamber R3 so that the spring coefficient of the air is set to a lower value under low pressure of the air in gas chamber R3 and set at a high value under high pressure of the air.

The inlet-outlet port 40a2 is connected to pneumatic pumps 82, 83 through a three-way valve 81. The three-way valve 81 is provided with an electromagnetic solenoid 81a which is energized under control of an electric control apparatus 84 to switch over the three-way valve 81. The pneumatic pumps 82, 83 are also activated under control of the electric control apparatus 84. To control the pressure of air in the gas chamber R3, a pressure sensor 85 is disposed between the three-way valve 81 and gas chamber R3 to detect the pressure in gas chamber R3 for applying an electric signal indicative of the detected pressure to the electric control apparatus 84. The three-way valve 81, pneumatic pumps 82, 83, electric control apparatus 84 and pressure sensor 85 are mounted on an appropriate place of the vehicle body structure 22.

Assuming that the solenoid 81a has been energized under control of the electric control apparatus 84 to set the three-way valve 81 in a first or lower position and that the pneumatic pump 83 has been activated under control of the electric control apparatus 84, the three-way valve 81 permits the atmospheric air introduced into the gas chamber R8 therethrough. In such an instance, the spring coefficient of the air in the gas chamber R3 to pass is increased in accordance with an increase of the pressure of air introduced into the gas chamber R3, and in turn, the pressure sensor 85 applies a detection signal to the electric control apparatus 84 when it is detected that the spring coefficient of the air has reached a predetermined value. When applied with the detection signal, the electric control apparatus 84 energizes the solenoid 81a to switch over the three-way valve 81 to a second or intermediate position and deactivates the pneumatic pump 83. As a result, the introduction of the air into the gas chamber R3 is blocked to maintain the spring coefficient of the air at the predetermined value.

Assuming that the solenoid 81a has been energized under control of the electric control apparatus 84 to set the three-way valve 81 in a third or upper position and that the pneumatic pump 82 has been activated under control of the electric control apparatus 84, the air is discharged from the gas chamber RS through the three-way valve 81. In such an instance, the spring coefficient of the air in the gas chamber R3 is decreased in accordance with a decrease of the pressure of air in the gas chamber R3. When it has been detected by the pressure sensor 85 that the spring coefficient of the air has reached a desired value, the electric control apparatus 84 energizes the solenoid 81a to switch over the three-way valve 81 to the second or intermediate position and deactivates the pneumatic pump 82. As a result, the discharge of the air is blocked to maintain the spring coefficient of the air at the desired value. During the foregoing operation, the step motor 49 of the damper device 40 is operated under control of the electric control apparatus 84 to control damping action of the damper device 40.

In the suspension system of the third modification, the air in the gas chamber R3 acts as a spring element between the unsprung and sprung masses 21 and 22 in series with the damping force generating mechanism composed of the piston 43, relief valves 45a, 45b and variable throttle valve in the damper device 40, and a spring coefficient control mechanism is composed of the three-way valve 81 and pneumatic pumps 82, 83 to electrically adjust the spring coefficient of the air in the gas chamber R3 under control of the air. With the suspension system, the spring coefficient of the spring element in series with the damper device 40 can be varied in a simple manner during traveling of the vehicle to maintain the riding comfort of the vehicle in a good condition. Since in the third modification, the air in the gas chamber R3 is adapted as the spring element, the suspension system can be provided in a compact construction.

Figure 8:
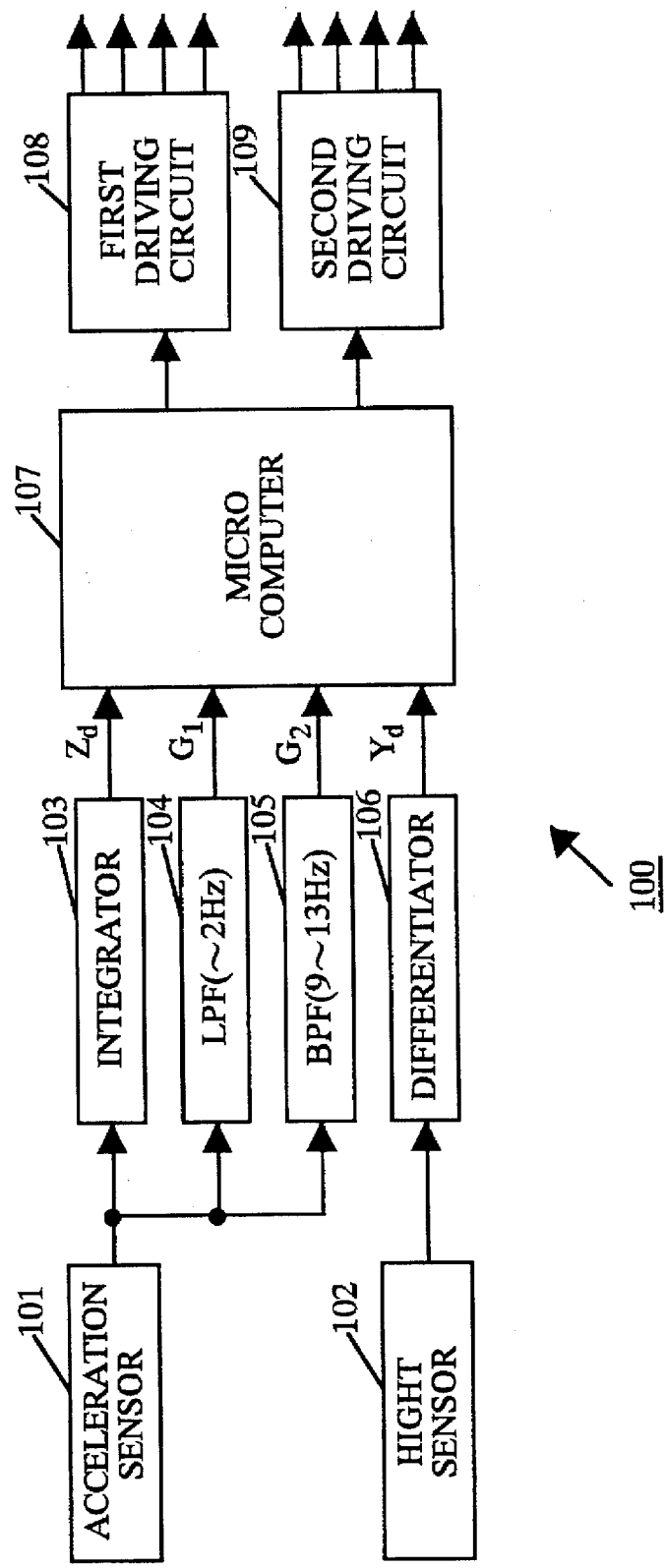
FIG. 8 is a block diagram of a preferred embodiment of an electric control apparatus for the suspension systems shown in accordance with the present invention.
Figure 36:
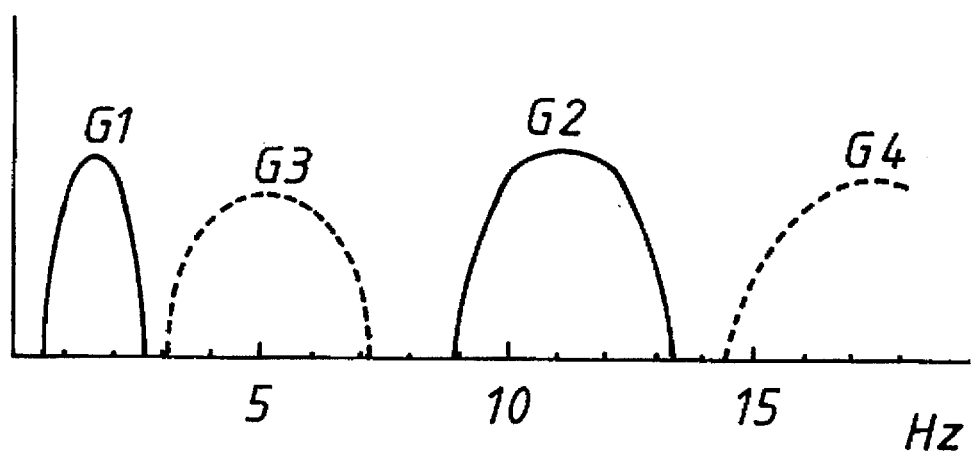
FIG. 36 is a graph showing distribution of various vibration components of the vehicle body structure.

Illustrated in FIG. 8 is a preferred embodiment of an electric control apparatus 100 adapted for use in the suspension systems as the electric control apparatuses 65, 74 and 84. The electric control apparatus 100 includes an acceleration sensor 101 and a vehicle height sensor 102. The acceleration sensor 101 is mounted on the vehicle body structure 22 or the stationary plate 33 in the suspension systems respectively shown in FIGS. 3, 5, 6 and 7. The acceleration sensor 101 is designed to detect an acceleration of the sprung mass 22 in a vertical direction with respect to an absolute space for producing an electric signal indicative of the detected vertical acceleration, provided that the detected vertical acceleration represents an upward acceleration by a positive value and represents a downward acceleration by a negative value. The acceleration sensor 101 is connected to an integrator 103, a low-pass filter 104 and a band-pass filter 105. The integrator 103 integrates an electric signal indicative of the vertical acceleration for producing an output signal indicative of an absolute vertical displacement velocity Zd of the vehicle body structure 22. The low-pass filter 104 is provided to restrict the electric signal indicative of the vertical acceleration to a band width of 2 Hz for producing an output signal indicative of a vibration component $G_1$ of the sprung mass corresponding with a resonant frequency of the sprung mass. (see FIG. 36) The band-pass filter 105 is provided to restrict the electric signal indicative of the vertical acceleration to a band width of 9–13 Hz for producing an output signal indicative of a vibration component $G_2$ of the sprung mass corresponding with a resonant frequency of the unsprung mass. (see FIG. 36)

The height sensor 102 of the vehicle is in the form of a displacement sensor which is disposed between the unsprung and sprung masses 21 and 22 to detect an amount of relative vertical displacement of the sprung mass 22 to the unsprung mass 21 for producing an output signal indicative of the detected amount of relative vertical displacement, provided that the amount of relative vertical displacement represents an extended amount of the damper device 40 by a positive value and represents a compressed amount of the damper device 40 by a negative value. The height sensor 102 is connected to a differentiator 106 which differentiates the output signal indicative of the amount of relative vertical displacement for producing an output signal indicative of a relative vertical displacement velocity Yd of the sprung mass 22 to the unsprung mass 21.

Figure 9:
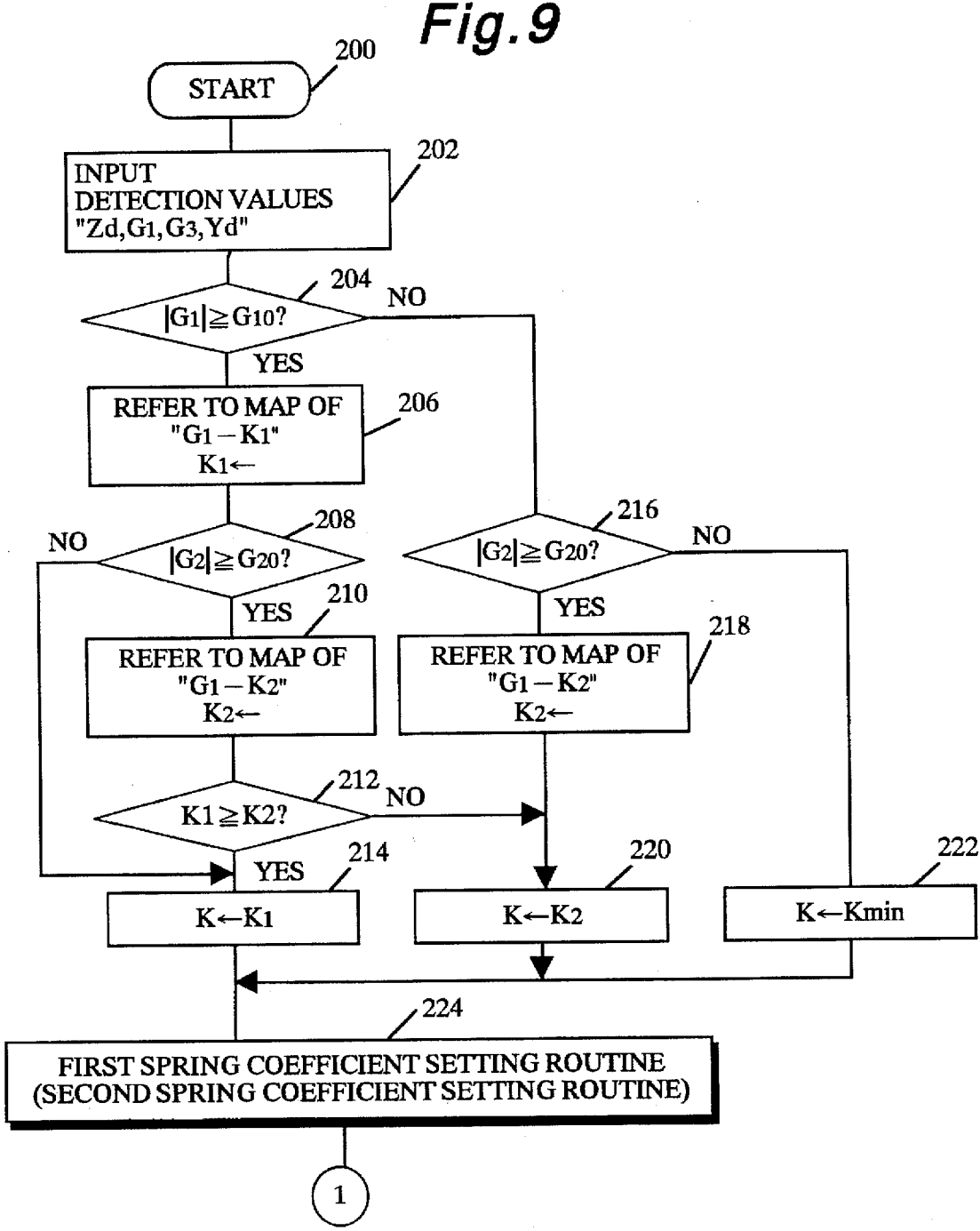
FIG. 9 is a flow chart of a first part of a control program executed by a microcomputer shown in FIG. 8.
Figure 10:
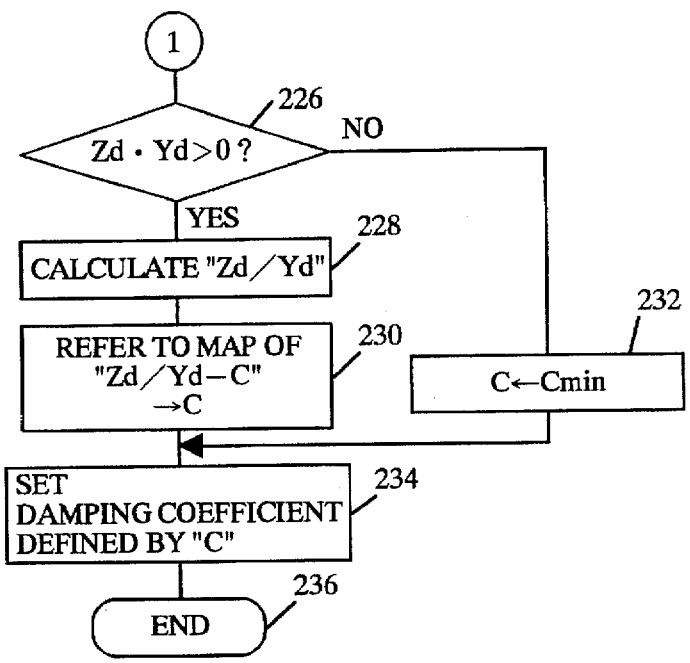
FIG. 10 is a flow chart of a second part of the control program.
Figure 11:
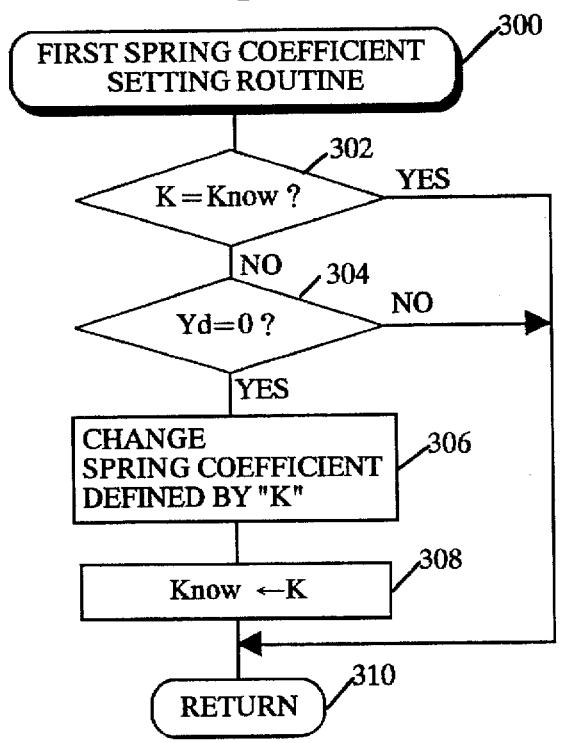
FIG. 11 is a flow chart of a first spring coefficient setting routine shown in FIG. 9.

The integrator 103, low-pass filter 104, band-pass filter 105 and differentiator 106 are connected to a microcomputer 107 which is programmed to repeat execution of a control program shown by flow charts in FIGS. 9–11 at a predetermined time interval under control of an internal timer (not shown). During execution of the control program, the computer 107 produces a control signal for electrically controlling the spring coefficient of the spring element and the damping coefficient of the damper device 40 in the suspension system and applies it to a first driving circuit 108 for control of the spring coefficient and a second driving circuit 109 for control of the damping coefficient.

Figure 12:
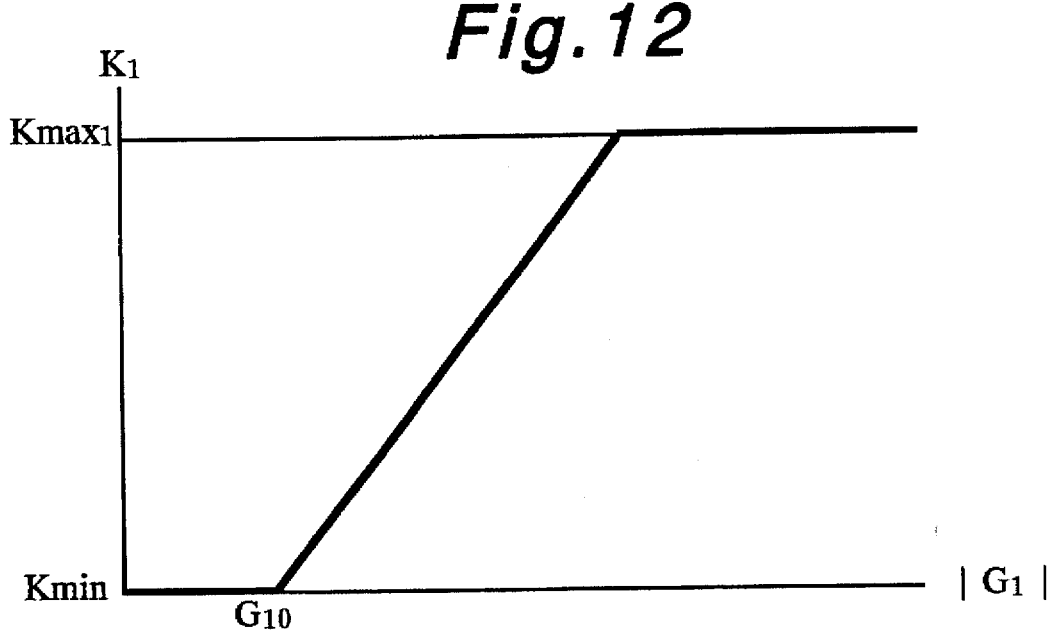
FIG. 12 is a map of $G_1$–$K_1$ showing a first target spring coefficient $K_1$ in relation to a vibration component $G_1$.
Figure 13:
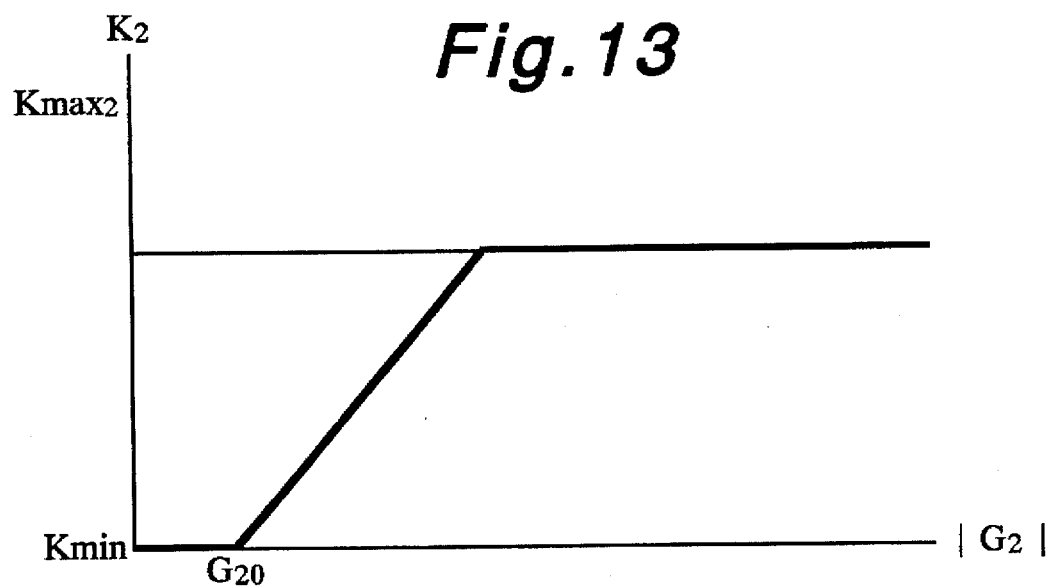
FIG. 13 is a map of $G_2$–$K_2$ showing a second target spring coefficient $K_2$ in relation to a vibration component $G_2$.

Hereinafter, the operation of the suspension system under control of the electric control apparatus 100 will be described in detail with reference to the flow charts. Assuming that an ignition switch of the vehicle is closed to activate the electric control apparatus 100, the computer 107 starts to execute the control program at step 200 in FIG. 9 and is applied with output signals from the integrator 103, low-pass filter 104, band-pass filter 105 and differentiator 105 to read out an absolute vertical displacement velocity Zd, vibration components $G_1$, $G_2$ and a relative vertical displacement velocity Yd of the sprung mass of the vehicle. Subsequently, the computer 107 executes processing at step 204–222 to set a target spring coefficient "K" in accordance with the magnitude of the vibration components $G_1$ and $G_2$. If each absolute value of the vibration components G1, G2 is more than threshold values $G_{10}$, $G_{20}$, the computer 107 executes processing at step 204–210 to determine first and second target spring coefficients "$K_1$, $K_2$" respectively corresponding with the vibration components $G_1$, $G_2$ with reference to a map of $G_1$–$K_1$ in FIG. 12 and a map of $G_2$–$K_2$ in FIG. 13. In FIGS. 12 and 13, "Kmax 1" is defined to be larger than "Kmax 2". Thereafter, the computer 107 executes processing at step 212 and 214 or 220 to set either larger value of the first and second target spring coefficients "$K_1$, $K_2$" as a target spring coefficient "K".

If an absolute value of the vibration component $G_1$ is more than the threshold value $G_{10}$ while an absolute value of the vibration component $G_2$ is less than the threshold value $G_{20}$, the computer 107 executes processing at step 204–208 and 214 to set the first target spring coefficient "$K_1$" as a target spring coefficient "K". If an absolute value of the vibration component $G_1$ is less than the threshold value $G_{10}$ while an absolute value of the vibration component $G_2$ is more than the threshold value $G_{20}$, the computer 107 executes processing at step 204, 216–220 to set the second target spring coefficient "$K_1$" as a target spring coefficient "K". If each absolute value of the vibration components $G_1$, $G_2$ is less than each of the threshold values G10, G20, the computer 107 executes processing at step 204, 216 and 222 to set a minimum spring coefficient Kmin as a target spring coefficient "K". In this instance, the target spring coefficient "K" is immediately varied by processing at step 214, 220, 222 when it is increased by processing at step 204–218 but maintained in the set value for a predetermined time when it is decreased by processing at 204–218.

After setting the target spring coefficient "K", the computer 107 executes a first spring coefficient setting routine shown in FIG. 11 at step 224. When starting execution of the first spring coefficient setting routine at step 300, the computer 107 determines at step 302 whether or not the target spring coefficient "K" is equal to an instant spring coefficient "Know" indicative of a current spring coefficient of the spring element in the suspension system. If the answer at step 302 is "Yes", the computer 107 finishes the execution of the first spring coefficient setting routine at step 310. If the answer at step 302 is "No", the program proceeds to step 304 where the computer 107 determines whether the relative vertical displacement velocity Yd has become "0" or not. When the relative vertical displacement velocity has become "0", the computer 107 sets the spring coefficient of the spring element to the target spring coefficient "K" at step 306. During processing at step 306, the computer 107 applies a control signal indicative of the target spring coefficient "K" to the first driving circuit 108. In response to the control signal, the first driving circuit 108 activates the spring coefficient control mechanism in such a manner that the spring coefficient of the spring element in the suspension system is set to the target spring coefficient "K" as described below.

In the suspension system of this embodiment, the electromagnetic solenoids 58 corresponding with the target spring coefficient "K" are energized while the other solenoids 58 are deenergized. As a result, only the coil springs 53 corresponding with the energized solenoids 58 become active to set their spring coefficients to the target spring coefficient "K". In the suspension system shown in FIG. 5, the piezoelectric actuator 66 is applied with a control voltage corresponding with the target spring coefficient "K" from the first driving circuit 108. As a result, the internal cavity 61b of resilient block member 61 is supplied with an amount of hydraulic fluid defined by the control voltage so that the spring coefficient of the resilient block member 61 is set to the target spring coefficient "K". In the suspension system shown in FIG. 8, the electromagnetic solenoid 72a of the three-way valve 72 is energized in response to the control signal from the first driving circuit 108, and each operation of the pneumatic pumps 73, 74 is controlled in accordance with a pressure detected by the pressure sensor 76. As a result, an amount of the air introduced into the hydraulic fluid in the cylinder 40a is controlled in such a manner that the spring coefficient of the hydraulic fluid is set to the target spring coefficient "K". In the suspension system shown in FIG. 7, the electromagnetic solenoid 81a of the three-way valve 81 is energized in response to the control signal from the first driving circuit 108, and each operation of the pneumatic pumps 82, 83 is controlled in accordance with a pressure detected by the pressure sensor 85. As a result, the pressure of air in the gas chamber R3 is controlled in such a manner that the spring coefficient of the air is set to the target spring coefficient "K".

After processing at step 306 in FIG. 11, the computer 107 renews at step 308 the current spring coefficient "Know" with the target spring coefficient "K" and finishes the execution of the first spring coefficient setting routine at step 310. Subsequently, the computer 107 executes processing at step 226–234 to control the damping coefficient of the damping force generating mechanism in the damper device 40 in accordance with the absolute vertical displacement velocity Zd and relative vertical displacement velocity Yd. If the sign of the absolute vertical displacement velocity Zd is different from the sign of the relative vertical displacement velocity Yd, the computer 107 determines a "No" answer at step 226 and sets at step 232 a target damping coefficient "C" to a minimum damping coefficient Cmin. Thus, the computer 107 applies a control signal indicative of the target damping coefficient "C" to the second driving circuit 109 at step 234. In response to the control signal, the second driving circuit 109 acts to control the rotational position of step motor 49 in the damper device 40 to a position corresponding with the target damping coefficient "C".

Figure 15:
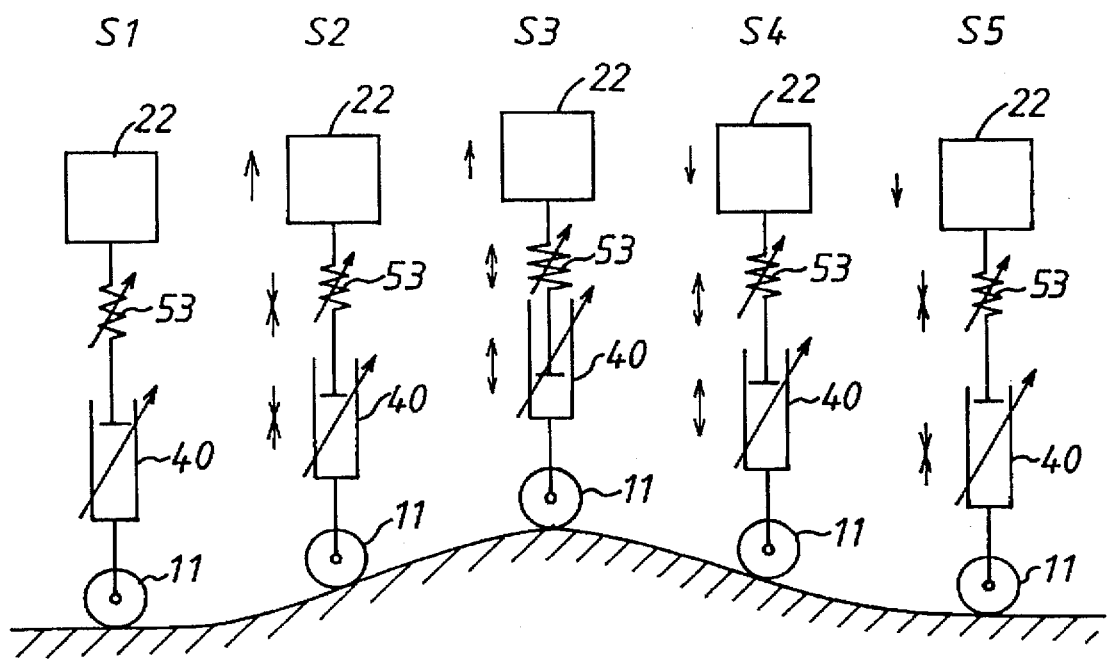
FIG. 15 illustrates movement conditions of a vehicle body structure, a damper device and a spring while a wheel is passing over a projection on a road.

Such a condition as described above is caused before a wheel 11 of the vehicle runs up a projection on the road as shown by the character S2 in FIG. 15 or immediately after the wheel 11 ran over the projection on the road as shown by the character S4 in FIG. 15. Although under these conditions, the vehicle body structure 22 is pushed up by an external force transmitted from the road surface or suddenly dropped, the damper device 40 acts to absorb push-up or drop of the vehicle body structure 22 so as to maintain the riding comfort of the vehicle in a good condition.

Figure 14:
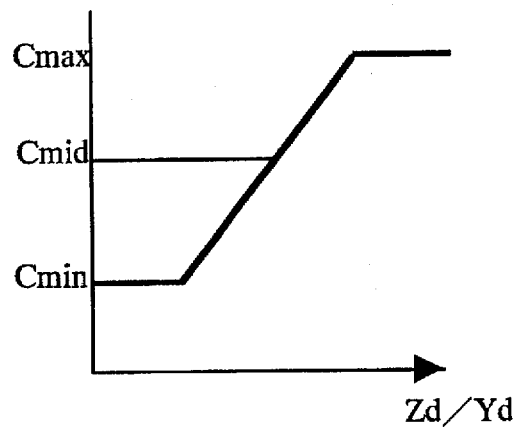
FIG. 14 is a map of Zd/Yd-C showing a damping coefficient C in relation to a vertical displacement velocity ratio Zd/Yd.

If the sign of the absolute vertical displacement velocity Zd is identical with the sign of the relative vertical displacement velocity Yd, the computer 107 determines a "Yes" answer at step 226, calculates at step 228 a ratio of the absolute vertical displacement velocity Zd and the relative vertical displacement velocity Yd and determines at step 280 a target damping coefficient "C" corresponding with the velocity ratio with reference to a map of Zd/Yd shown in FIG. 14. The target damping coefficient "C" is determined on a basis of the skyhook theory proposed by D. Karnopp to efficiently dampen the vertical vibration of the vehicle body structure 22. After processing at step 230, the computer 107 executes processing at step 234 to control the rotational position of the step motor 49 in the damper device 40 to a position defined by the target damping coefficient "C". During execution of the processing at step 230 and 232, the target damping coefficient "C" is immediately varied when it is increased by processing at step 226–230 but maintained in the set value for a predetermined time when it is decreased by processing at step 226–230.

Such a condition as described above is caused when the spring element 31 causes vertical displacement of the vehicle body structure 22 as shown by the characters S3, S4 in FIG. 15. Thus, the spring element 31 acts to efficiently dampen the vibration of the vehicle body structure 22.

As is understood from the above description, an increase of the vibration components $G_1$, $G_2$ of the sprung mass is detected on a basis of the resonant frequencies of the sprung and unsprung masses by processing at step 204, 208 and 216 so that the spring coefficient of the spring element is increased in accordance with the increase of the vibration components $G_1$, $G_2$ by processing at step 206, 210, 214, 218, 220 and 224. This means that the damping coefficient of the damping force generating mechanism (42, 43, 45a or 45b) in the damper device 40 is increased in accordance with an increase of the vibration of the sprung mass to efficiently absorb the vibration of the sprung mass. In addition, when the vibration components $G_1$, $G_2$ do not increase, the spring coefficient of the spring element is set at a small value by processing at step 222 and 224 so that the spring element acts to effectively absorb small vibration of the sprung mass caused by an forces generated by road surfaces so as to maintain the riding comfort of the vehicle in a good condition.

Particularly, when the vibration component $G_1$ defined by the resonant frequency of the sprung mass is large, the spring coefficient of the spring element is set to a larger value by the foregoing processing than that when the vibration component $G_2$ defined by the resonant frequency of the unsprung mass is large. As a result, the spring element and the damping force generating mechanism become effective to dampen the vibration of the sprung mass in a low frequency region where the damping force generating mechanism acts to most effectively absorb the vibration of the sprung mass 22. Even if other vibration components of the sprung mass such as a vibration component $G_3$ between the resonant frequencies of the sprung and unsprung masses, a vibration component $G_4$ more than the resonant frequency of the unsprung mass, etc. are increased, the spring coefficient of the spring element is set in a small value by processing at the step 204, 216, 222 and 224. This is useful to eliminate unpleasant hard feeling applied to the passengers due to increase of the other vibration components.

In addition, the spring coefficient of the spring element is switched over by processing at the step 304, 306 only when the relative vertical displacement velocity Yd of the sprung mass 22 to the unsprung mass 21 is approximately "0". Accordingly, the spring coefficient of the spring element does not change when the spring element is being extended or compressed. This is useful to eliminate unpleasant shock applied to the passengers due to change of the spring coefficient. Since such control of the spring coefficient of the spring element is effected at the same time as control of the damping coefficient of the damping force generating mechanism is effected by processing at step 226–234, the damping coefficient and spring coefficient are controlled in accordance with a traveling condition of the vehicle to enhance both the damping effect of the vibration of the sprung mass and the riding comfort of the vehicle.

Figure 16:
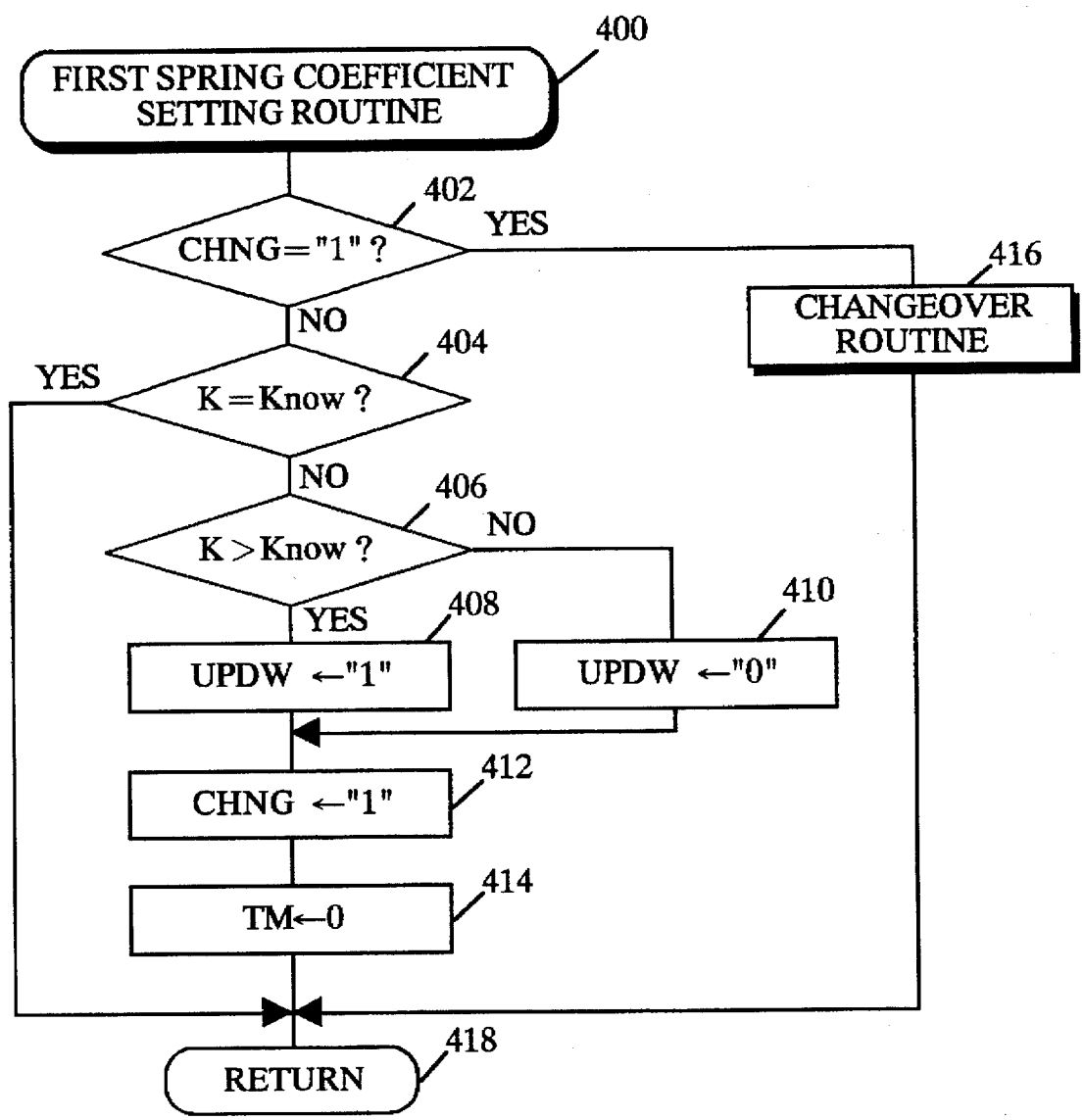
FIG. 16 is a flow chart of a second spring coefficient setting routine substituted for the first spring coefficient setting routine shown in FIG. 11.
Figure 17:
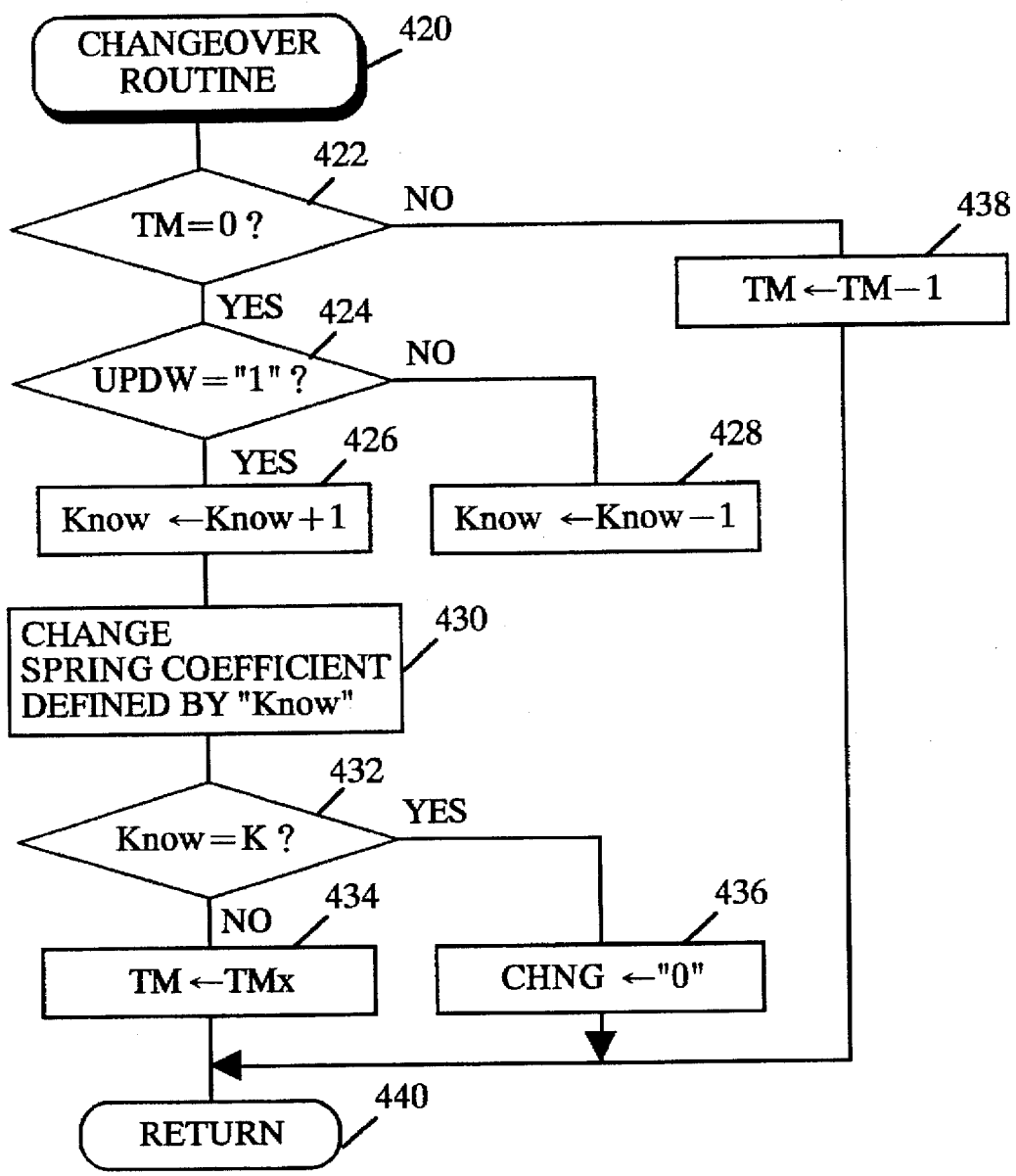
FIG. 17 is a flow chart of a changeover control routine shown in FIG. 16.

In actual practices of the present invention, the first spring coefficient setting routine executed at step 224 may be replaced with a second spring coefficient setting routine shown in FIGS. 16 and 17. When starting execution of the second spring coefficient setting routine at step 400, the computer 107 determines at step 402 whether a changeover flag CHNG is "1" or not. Since the changeover flag CHNG is initialized as "0" at an initial stage, the computer 107 determines a "No" answer at step 402 and causes the program to proceed to step 404. If the target spring coefficient "K" set by processing at step 204–222 in FIG. 9 is identical with the current spring coefficient "Know", the computer 107 determines a "Yes" answer at step 404 and finishes at step 418 execution of the second coefficient setting routine. In such an instance, the spring coefficient of the spring element does not change.

If the target spring coefficient "K" is not identical with the current spring coefficient "Know", the computer 107 determines a "No" answer at step 404 and causes the program to proceed to step 406–410. If the target spring coefficient "K" is larger than the current spring coefficient "Know", the program proceeds to step 408 where the computer 107 sets an up-down count flag UPDW as "1". If the target spring coefficient "K" is smaller than the current spring coefficient "Know", the program proceeds to step 410 where the computer 107 sets the up-down count flag UPDW as "0". After setting the up-down count flag UPDW, the computer 107 sets at step 412 the changeover flag CHNG as "1", initializes at step 414 a time count value TM as "0" and finishes execution of the second spring coefficient setting routine at step 426.

When the changeover flag CHNG is set as "1", the computer 107 determines a "Yes" answer at step 402 and causes the program to proceed to step 416 for execution of a changeover control routine shown in FIG. 17. When starting execution of the changeover control routine at step 420, the computer 107 determines at step 422 whether the time count value TM is "0" or not. If the answer at step 422 is "Yes", the computer 107 determines at step 424 whether the up-down count flag UPDW is "1" or not. If the answer at step 424 is "Yes", the computer adds "1" to the current spring coefficient "Know" at step 426. If the answer at step 424 is "No", the computer 107 subtracts "1" from the current spring coefficient "Know" at step 428. After renewal of the current spring coefficient "Know", the computer 107 changes at step 430 the spring coefficient of the spring element in the suspension system to the current spring coefficient "Know" substantially in the same manner as in processing at step 306 of the first spring coefficient setting routine in FIG. 11. As a result, if the target spring coefficient "K" is larger than the current spring coefficient "Know", the spring coefficient of the spring element in the suspension system increases by a small amount. If the target spring coefficient "K" is smaller than the current spring coefficient "Know", the spring coefficient of the spring element decreases by a small amount.

When the program proceeds to step 432, the computer 107 determines a "No" answer until the current spring coefficient "Know" becomes equal to the target spring coefficient "K". In such an instance, the computer 107 sets at step 434 the time count value TM to a predetermined positive time value TMx and finishes execution of the changeover control routine at step 440. When restarting execution of the second spring coefficient setting routine, the computer 107 resumes execution of the changeover control routine since the changeover flag CHNG is being set as "1" at step 438. Thus, the computer 107 determines a "No" answer at step 422, subtracts "1" from the time count value TM at step 438 and finishes execution of the changeover control routine. When the time count value TM becomes "0" after repeated execution of processing at step 438, the computer 107 determines a "Yes" answer at step 422 and causes the program to proceed to step 424–430. As a result, the spring coefficient of the spring element in the suspension system gradually converges toward the target spring coefficient "K".

When the current spring coefficient "Know" becomes equal to the target spring coefficient "K", the computer 107 determines a "Yes" answer at step 432 and sets at step 436 the changeover flag CHNG as "0". In turn, the computer 107 determines a "No" answer at step 402 in FIG. 16 when restarting execution of the first spring coefficient setting routine and causes the program to proceed to step 404. Thus, the changeover processing of the spring coefficient of the spring element finishes. When the current spring coefficient "Know" becomes again equal to the target spring coefficient "K", the spring coefficient of the spring element in the suspension system is controlled to gradually converge toward the target spring coefficient "K".

In such a manner as described above, the computer 107 measures lapse of a time by processing at step 434, 438 and produces a control signal for successively changing the spring coefficient of the spring element at each lapse of the predetermined time. Accordingly, the spring coefficient of the spring element is gradually changed even in a condition where the spring coefficient of the spring element is greatly changed. This is useful to eliminate unpleasant shock to the passengers due to sudden change of the spring coefficient for enhancing the riding comfort of the vehicle.

Hereinafter, a first modification of the electric control apparatus 100 for the suspension systems will be described with reference to FIG. 18. In the first modification, a low-pass filter 111 is connected to the integrator 103, and a low-pass filter 112, band-pass filters 113, 114 and a high-pass filter 115 are connected to the differentiator 106, respectively. The low-pass filter 111 is designed to restrict the output signal indicative of the absolute vertical displacement velocity of the sprung mass applied from the integrator 103 in a band width of less than 2 Hz for issuing the restricted signal as an output signal indicative of the absolute vertical displacement velocity Zd of the sprung mass. The low-pass filter 112 is designed to restrict the output signal indicative of the relative vertical displacement velocity of the sprung mass to the unsprung mass applied from the differentiator 106 in a band width of less than 2 Hz for issuing the restricted signal as an output signal indicative of the relative vertical displacement velocity Yd of the sprung mass. The band-pass filter 113 is designed to restrict the output signal indicative of the relative vertical displacement velocity applied from the differentiator 106 in a band width of 3–7 Hz for issuing the restricted signal as an output signal indicative of the relative vertical displacement velocity $V_2$ of the sprung mass in a frequency band width between the resonant frequencies of the sprung and unsprung masses. The band-pass filter 114 is designed to restrict the output signal indicative of the relative vertical displacement velocity applied from the differentiator 106 in a band width of 9–13 Hz for issuing the restricted signal as an output signal indicative of the relative vertical displacement velocity $V_3$ of the sprung mass in the band width of the resonant frequency of the unsprung mass. The high-pass filter 115 is designed to restrict the output signal indicative of the relative vertical displacement velocity applied from the differentiator 106 in a band width of more than 13 Hz for issuing the restricted signal as an output signal indicative of the relative vertical displacement velocity $V_4$ of the sprung mass at a higher frequency band width than the resonant frequency of the unsprung mass. In this modification, the computer 107 is programmed to execute a control program shown by flow charts in FIGS. 19 and 20.

Figure 19:
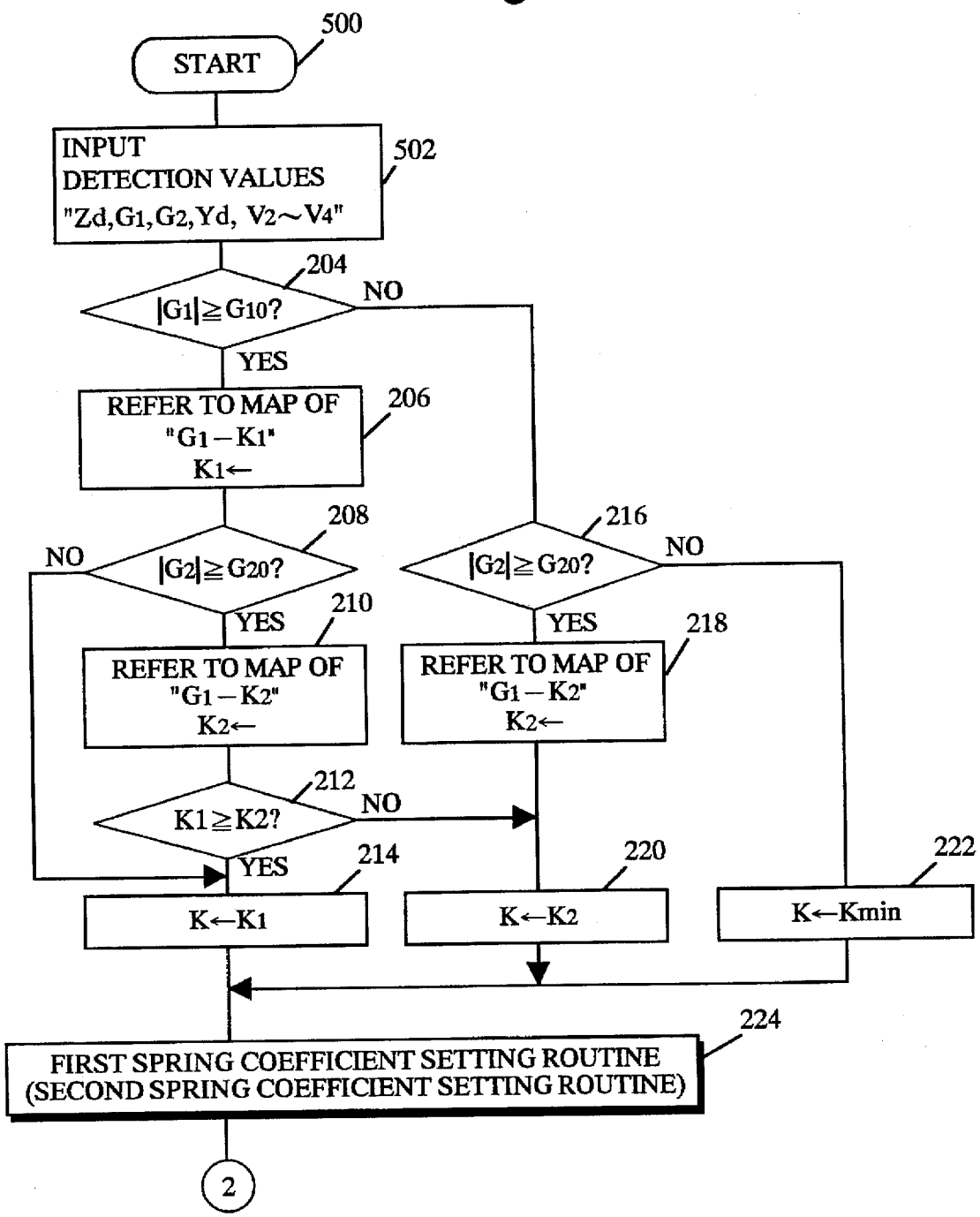
FIG. 19 is a flow chart of a first part of a control program executed by the microcomputer shown in FIG. 18.

Hereinafter, the operation of the suspension system under control of the modeled electric control apparatus 100 will be described with reference to FIGS. 19 and 20. Assuming that the ignition switch of the vehicle has been closed to activate the electric control apparatus 100, the computer 107 starts to execute the control program at step 500 in FIG. 19 and it is applied at step 502 with output signals respectively indicative of an absolute vertical displacement velocity Zd, vibration components $G_1$, $G_2$ and relative vertical displacement velocities Yd, $V_2$, $V_3$, $V_4$ from the low-pass filters 111, 104, band filter 105, low-pass filter 112, band-pass filters 113, 114 and high-pass filter 115. Subsequently, the computer 107 determines a target spring coefficient "K" in accordance with each magnitude of the vibration components $G_1$, $G_2$ by processing at step 204–224 in FIG. 9 as in the foregoing embodiment and causes the spring coefficient of the spring element to coincide with the target spring coefficient "K".

Figure 20:
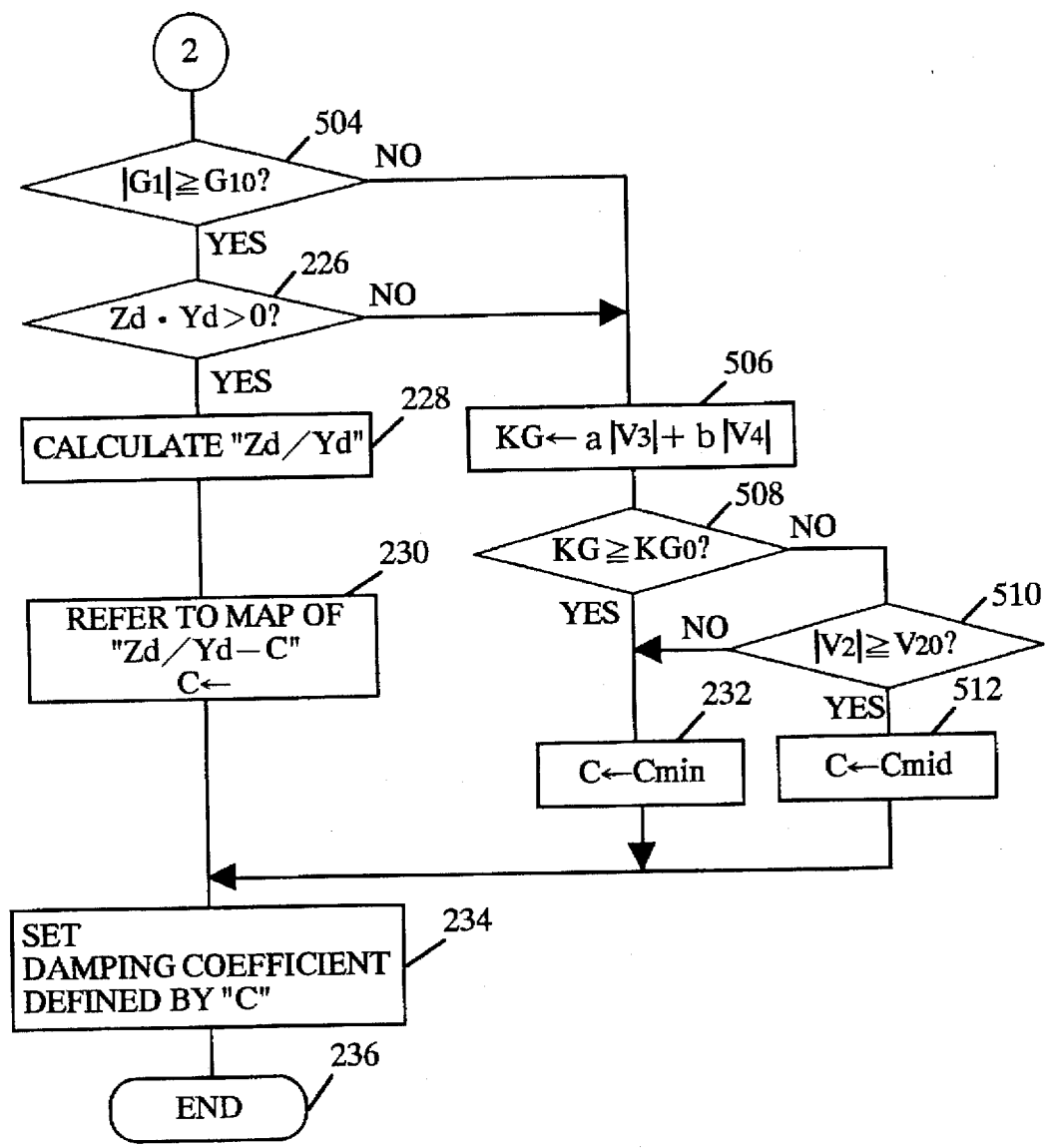
FIG. 20 is a flow chart of a second part of the control program.

After processing at step 204–224 in FIG. 9, the computer 107 executes processing at step 226–234 in FIG. 9 and 504–512 in FIG. 20 to set the damping coefficient of the damping force generating mechanism (42, 43, 45a, 45b or 46) by control of the damping coefficient control mechanism (48 or 49) in the damper device 40. In this instance, the computer 107 determines a "Yes" answer respectively at step 504, 226 only when the sign of the absolute vertical displacement velocity Zd is identical with the sign of the relative vertical displacement velocity Yd in a condition where the vibration component defined by the resonant frequency of the sprung mass is more than a predetermined threshold value $G_{10}$. Thus, the computer 107 executes processing at step 228, 230, 234 in the same manner as in the foregoing embodiment to set the damping coefficient of the damping force generating mechanism to the target damping coefficient "C" on a basis of the skyhook theory Provided that the absolute vertical displacement velocity Zd and relative vertical displacement velocity Yd each are comprised of a frequency component in the resonant frequency region of the sprung mass 22.

If the vibration component $G_1$ defined by the resonant frequency of the sprung mass is less than the threshold value $G_{10}$ or if the absolute vertical displacement velocity Zd and relative vertical displacement velocity Yd are different in their signs, the computer 107 multiplies at step 506 absolute values of the relative vertical displacement velocities $V_3$, $V_4$ of the sprung mass respectively by appropriate positive coefficients "a", "b" to obtain a vibration component KG. The vibration component KG corresponds with a vibration component of the sprung mass in a region other than the resonant frequency regions of the sprung and unsprung masses. If the vibration component KG is more than a predetermined threshold value $G_0$, the computer 107 determines a "Yes" answer at step 508 and sets the target damping coefficient "C" to a minimum value "Cmin" shown in FIG. 14 at step 232. As a result, the damping coefficient of the damping force generating mechanism is set as a small value at step 234 with respect to the vibration component in the region other than the resonant frequency regions of the sprung and unsprung masses. This is useful to enhance the riding comfort of the vehicle.

In this instance, even if the vibration component KG is less than the threshold value $G_0$, the computer 107 determines a "No" answer respectively at step 508 and 510 unless the relative vertical displacement velocity $V_2$ is more than a predetermined threshold value $V_{20}$, and executes processing at step 232, 234 to set the damping coefficient of the damping force generating mechanism to a small value for enhancing the riding comfort of the vehicle. If the relative vertical displacement velocity $V_2$ is more than the threshold value $V_{20}$, the computer 107 determines a "Yes" answer at step 510 and executes processing at step 512 to set the damping coefficient of the damping force generating mechanism to an intermediate value "Cmid" larger than the minimum value "Cmin". This is useful to quickly dampen vibration caused by resonance of the unsprung mass resulting from vibration of the vehicle body structure 22 in a frequency region defined by the resonant frequency of the unsprung mass.

As is understood from the above description, the damping coefficient of the damping force generating mechanism is set in a small value when the vibration component of the sprung mass is large to a high frequency region. This is useful to avoid useless damping control of the vibration at the high frequency region where the damper device 40 does not act to dampen the vibration of the sprung mass in a quick response.

When the vibration component defined by the resonant frequency of the sprung mass is large, the computer 107 executes processing at step 504, 228, 230, 234 to increase the damping coefficient of the damping force generating mechanism in accordance with an increase of the vibration of the sprung mass. When the vibration component of the sprung mass relative to the unsprung mass is large, the computer 107 executes processing at step 510, 512 to set the damping coefficient to the intermediate value "Cmid". When both the vibration components of the sprung and unsprung masses are large, the computer 107 executes processing at step 504, 506, 508, 510 to set the damping coefficient to the minimum value "Cmin". As a result, the vibration of the sprung mass is finely dampened to enhance the riding comfort of the vehicle.

Figure 18:
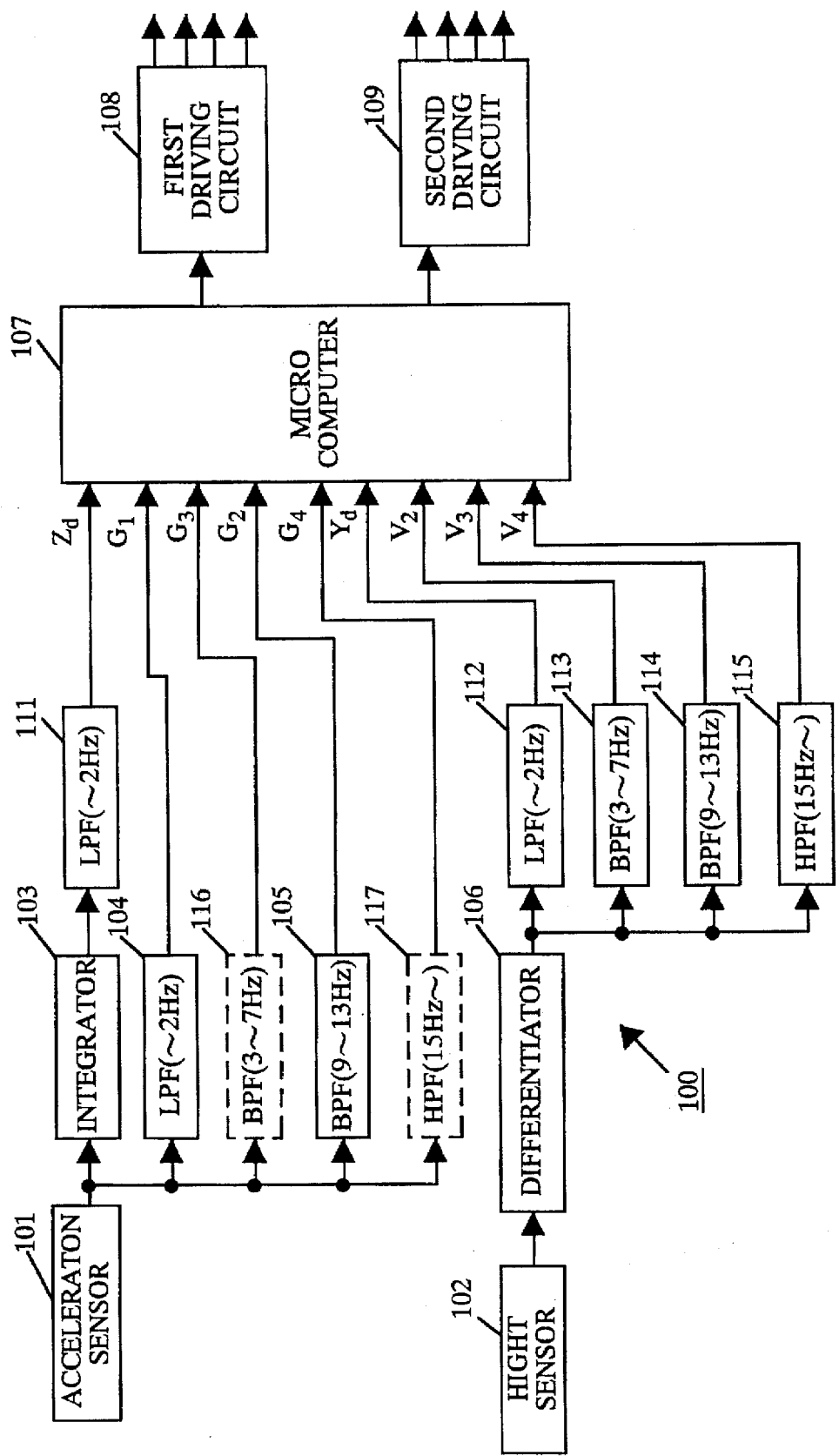
FIG. 18 is a block diagram of a first modification of the electric control apparatus shown in FIG. 8.

Although in the modified electric control apparatus the relative vertical displacement velocities $V_2-V_4$ are adapted to detect vibration of the sprung mass 22, each frequency component of vertical acceleration of the sprung mass 22 may be adapted instead of the relative vertical displacement velocities $V_2-V_4$, in this case, a band-pass filter 116 of 3–7 Hz and a high-pass filter 117 of 15 Hz are connected to the output of acceleration sensor 101 as shown by dotted lines in FIG. 18. In operation, the computer 107 is received as imput vibration components $G_3$, $G_4$ from the filters 116 and 117 at step 502 in FIG. 19 (see FIG. 36) to execute processing at step 508, 510 in FIG. 20 based on the vibration components $G_2-G_4$.

Figure 21:
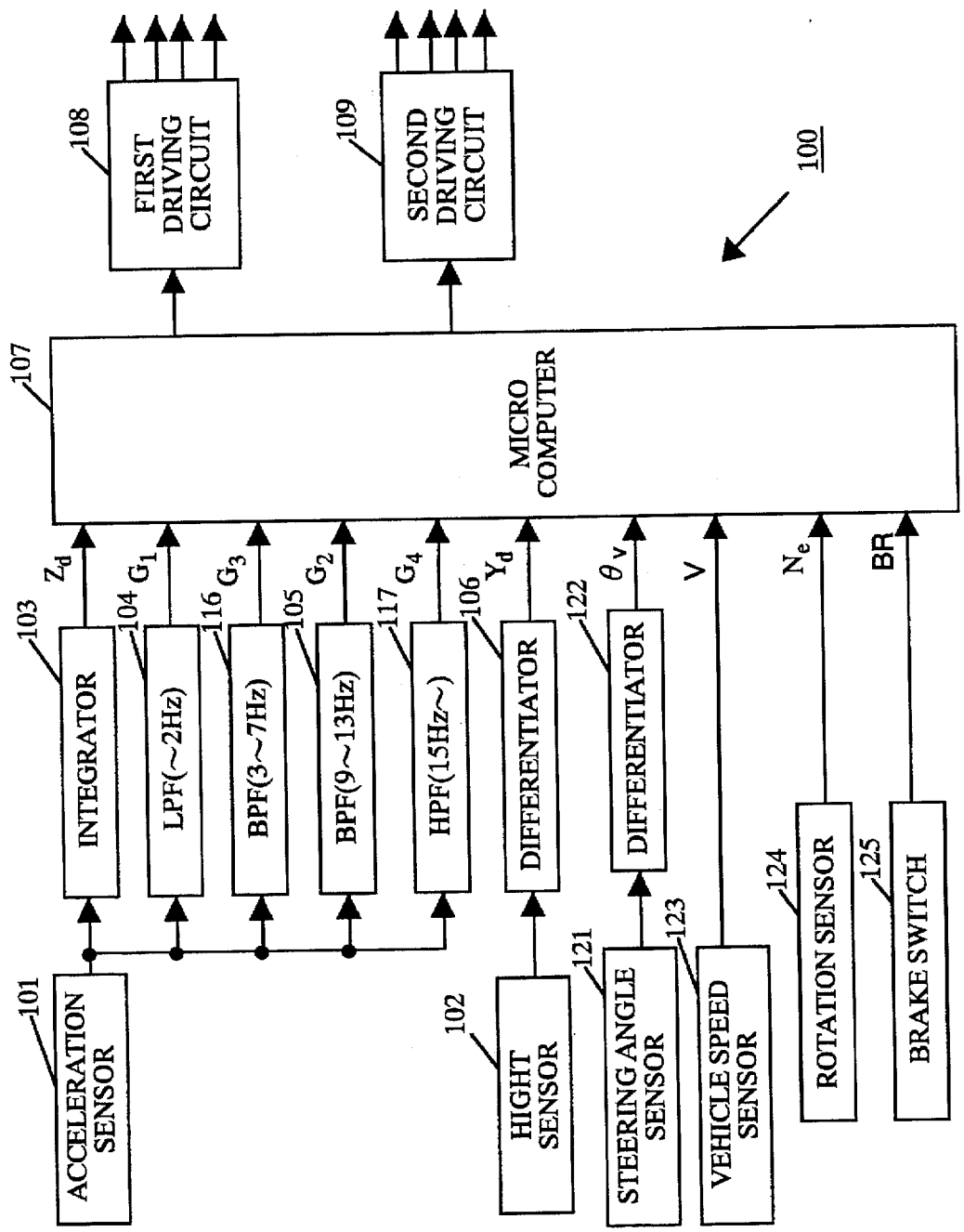
FIG. 21 is a block diagram of a second modification of the electric control apparatus shown in FIG. 8.

Hereinafter, a second modification of the electric control apparatus 100 for the suspension system will be described with reference to FIG. 21. In the second modification, the electric control apparatus 100 is further provided with a band-pass filter 118 and a high-pass filter 117 as in the first modification and provided with a steering angle sensor 121, a differentiator 122, a vehicle speed sensor 123, an engine rotation sensor 124 and a brake switch 125. The steering sensor 121 detects a steering angle θ, and the differentiator 122 differentiates the detected steering angle θ to produce an electric signal indicative of a steering speed θv. The vehicle speed sensor 123 detects a traveling speed V of the vehicle for producing an electric signal indicative of the detected traveling speed V, and the engine rotation sensor 124 detects a rotation number Ne of the prime engine of the vehicle for producing an electric signal indicative of the detected rotation number Ne. The brake switch 125 is in the form of a normally open switch which is closed in response to depression of the brake pedal of the vehicle to produce a high level brake signal BR. In this modification, the computer 107 is programmed to repeat execution of a control program shown by flow charts in FIGS. 22–26 at each lapse of a predetermined time measured by the internal timer.

Figure 22:
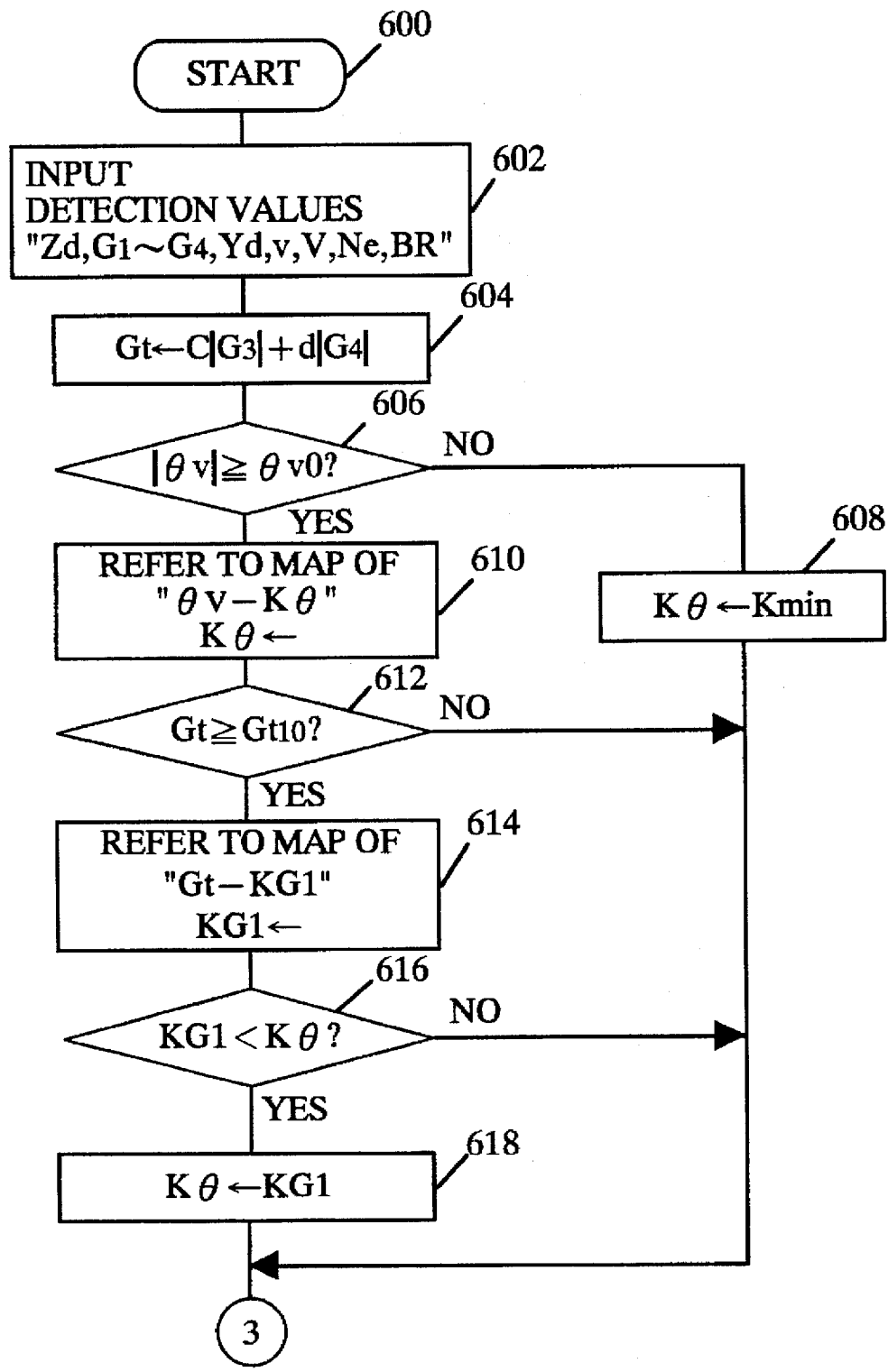
FIG. 22 is a flow chart of a first part of a control program executed by the microcomputer shown in FIG. 21.

Assuming that the ignition switch of the vehicle has been closed to activate the modified electric control apparatus, the computer 107 starts execution of the control program at step 600 in FIG. 22 and responds at step 602 to electric signals respectively indicative of an absolute vertical displacement velocity Zd of the sprung mass, vibration components $G_1-G_4$, a relative vertical displacement velocity Yd, a steering speed θv. a traveling speed V of the vehicle, a rotation number Ne of the prime engine and a high level brake signal BR respectively from integrator 103, low-pass filter 104, band-pass filters 116, 105, high-pass filter 117, differentiators 106, 122, vehicle speed sensor 123, engine rotation sensor 124 and brake switch 125.

Figure 27:
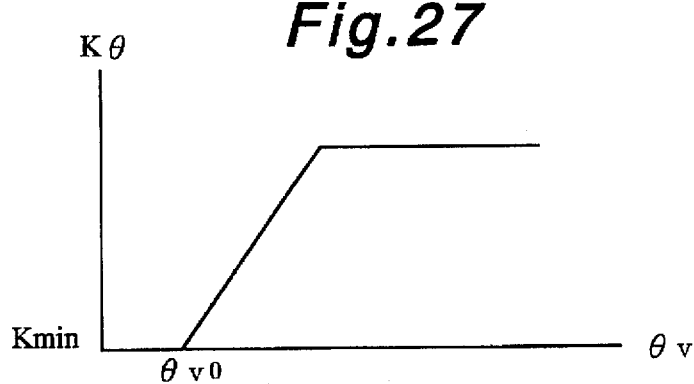
FIG. 27 is a map of θv–Kθ showing a target spring coefficient Kθ in relation to a steering speed θv.
Figure 28:
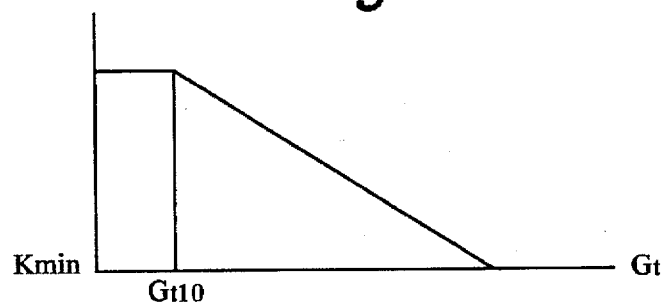
FIG. 28 is a map of $G_f$–$KG_1$ showing a spring coefficient $KG_1$ in relation to a vibration component Gt.

After processing at step 602, the computer 107 multiplies each absolute value of the vibration components $G_3$, $G_4$ respectively by appropriate coefficients "c", "d" and calculates a sum of resultants of the multiplication as a vibration component other than resonant frequency regions of the sprung and unsprung masses. Subsequently, the computer 107 executes processing at step 606–618 to determine a spring coefficient Kθ related to the steering speed θv. If an absolute value of the steering speed θ is less than a predetermined threshold value θv0, the computer 107 executes processing at step 606, 608 to define the spring coefficient Kθ to be a predetermined minimum spring coefficient Kmin shown in FIG. 27. If the absolute value of the steering speed θv is more than the threshold value θv0, the computer 107 executes processing at step 606, 610 to set the spring coefficient Kθ as a value to be increased in accordance with an increase of the absolute value θv of the steering speed θv, with reference to a map of θv–Kθ shown in FIG. 27. If in this instance the sum of vibration components Gt is less than a predetermined threshold value $Gt_{10}$, the computer 107 determines a "No" answer at step 612 and maintains the spring coefficient Kθ at the set value. If the sum of vibration components Gt is more than the threshold value Gt10, the computer 107 executes processing at step 612 and 614 to set the spring coefficient KG1 as a value to be decreased in accordance with an increase of the sum of vibration components Gt, with reference to a map of Gt–KG1 shown in FIG. 28. Thereafter, the computer 107 executes processing at step 616 and 618 to change the spring coefficient Kθ to the spring coefficient KG1 if the latter coefficient KG1 is smaller than the former coefficient Kθ.

Figure 23:
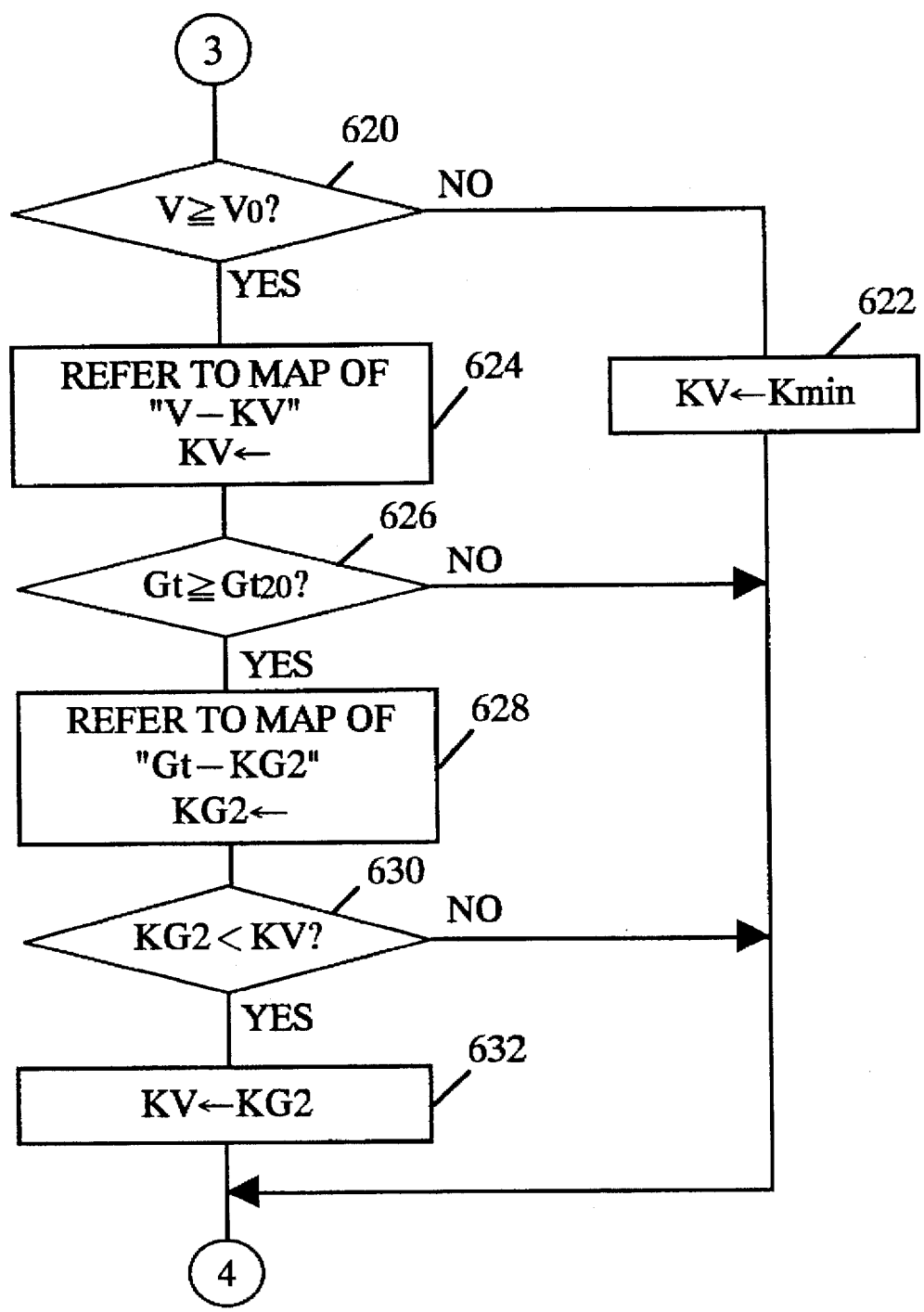
FIG. 23 is a flow chart of a second part of the control program.
Figure 29:
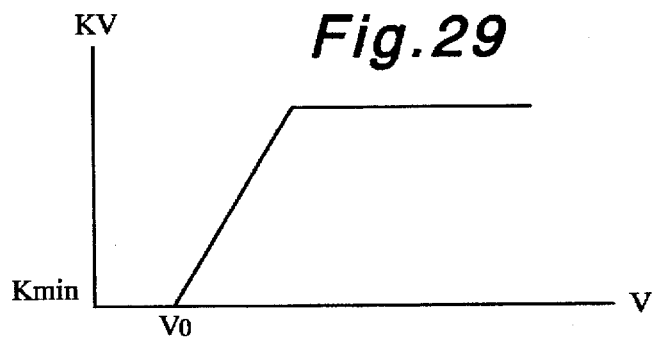
FIG. 29 is a map of V–K showing a target spring coefficient KV in relation to a vehicle speed V.
Figure 30:
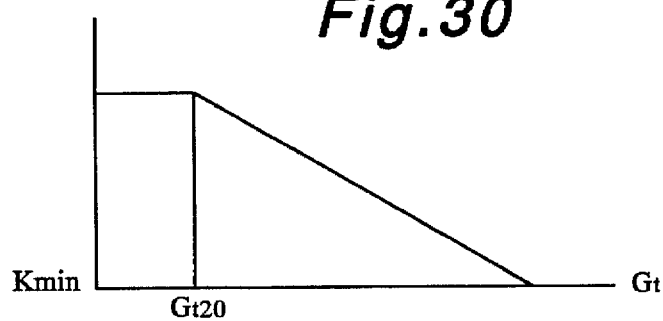
FIG. 30 is a map of Gt–$KG_2$ showing a spring coefficient $KG_2$ in relation to a vibration component Gt.

Subsequently, the computer 107 determines a spring coefficient KV related to the vehicle speed V by processing at step 620–632 shown in FIG. 23. If the vehicle speed V is less than a predetermined threshold value $V_0$, the computer 107 executes processing at step 620, 622 to set the spring coefficient KV to a predetermined minimum spring coefficient Kmin shown in FIG. 29. If the vehicle speed V is more than the threshold value $V_0$, the computer 107 executes processing at step 620, 624 to set the spring coefficient KV as a value to be increased in accordance with an increase of the vehicle speed V, with reference to a map of V–KV shown in FIG. 29. If in this instance the sum of vibration components Gt is less than a predetermined threshold value $Gt_{20}$, the computer 107 determines a "No" answer at step 626 and maintains the spring coefficient KV at the set value. If the sum of vibration components Gt is more than the threshold value $Gt_{20}$, the computer 107 executes processing at step 626 and 268 to set a spring coefficient $KG_2$ as a value to be decreased in accordance with an increase of the sum of vibration components Gt, with reference to a map of Gt–KG2 shown in FIG. 30. Thereafter, the computer 107 executes processing at step 630 and 632 to change the spring coefficient KV to the spring coefficient KG2 if the latter coefficient KG2 is smaller than the former coefficient KV.

Figure 24:
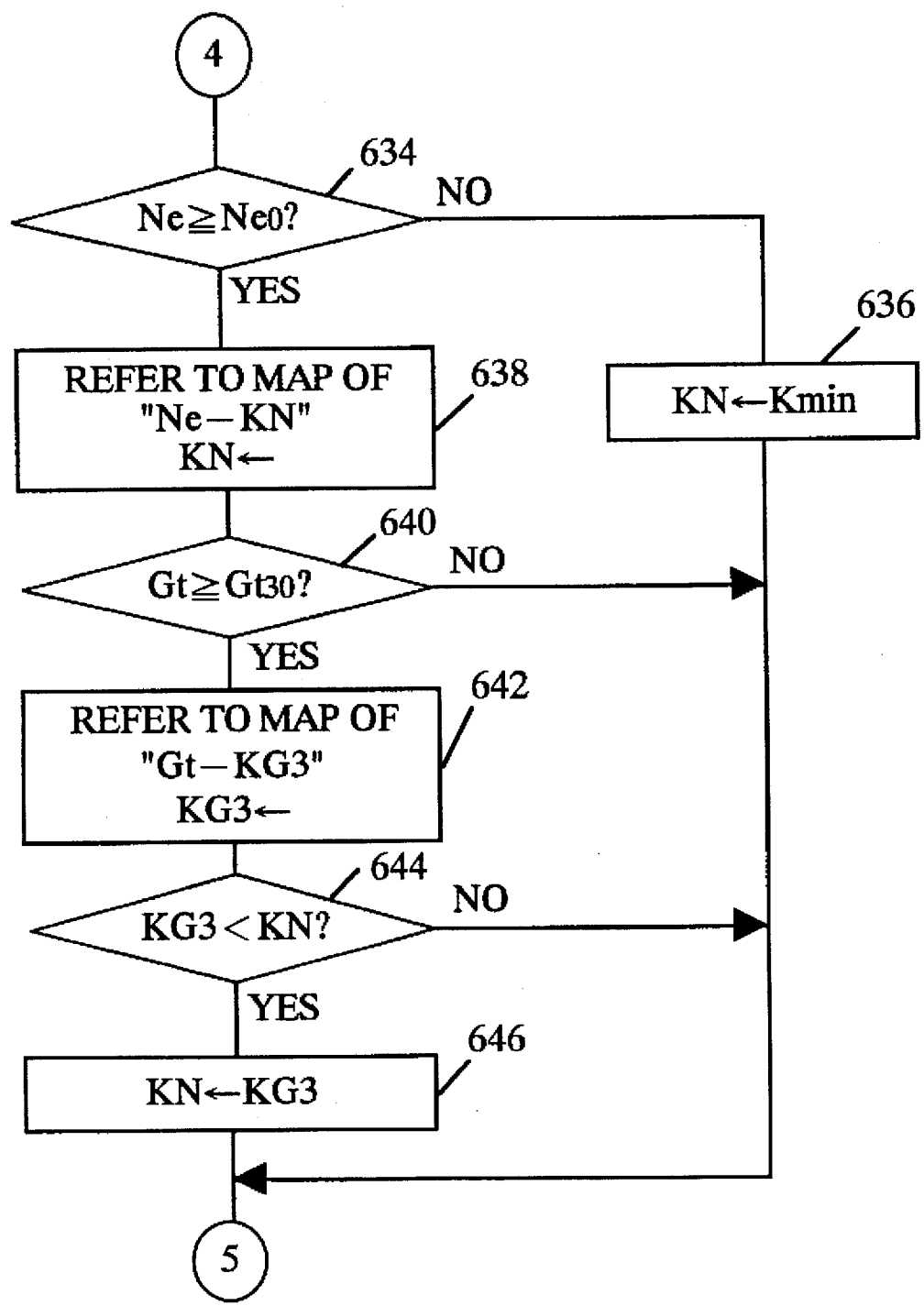
FIG. 24 is a flow chart of a third part of the control program.
Figure 31:
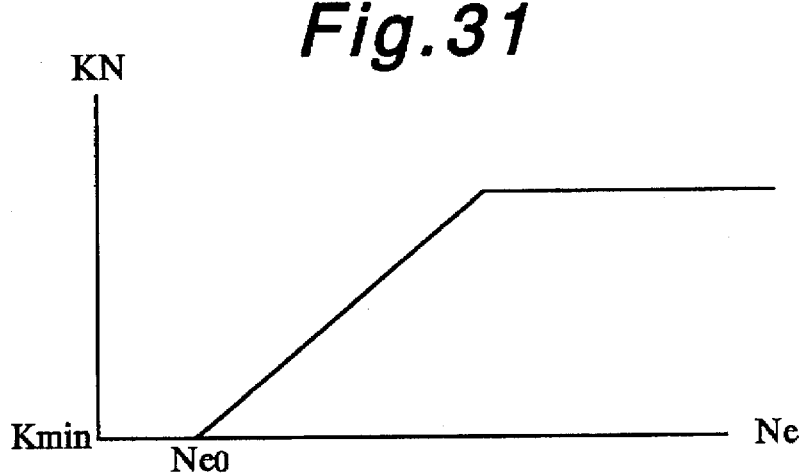
FIG. 31 is a map of Ne–KN showing a target spring coefficient KN in relation to a rotation number Ne of a prime engine of the vehicle.
Figure 32:
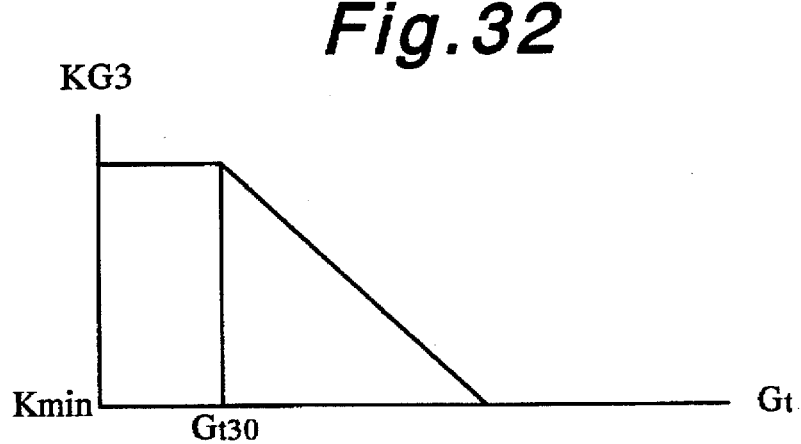
FIG. 32 is a map of Gt–$KG_3$ showing a spring coefficient $KG_3$ in relation to a vibration component Gt.

Subsequently, the computer 107 determines a spring coefficient KN related to the rotation number Ne of the prime engine or acceleration of the vehicle by processing at step 634–646 shown in FIG. 24. If the rotation number Ne of the prime engine is less than a predetermined threshold value $Ne_0$, the computer 107 executes processing at step 634 and 636 to set the spring coefficient KN to a predetermined minimum spring coefficient Kmin shown in FIG. 31. If the rotation number Ne of the prime engine is more than the threshold value $Ne_0$, the computer 107 executes processing at step 634 and 638 to set the spring coefficient KN as a value to be increased in accordance with an increase of the rotation number Ne of the prime engine, with reference to a map of Ne–KN shown in FIG. 31. If in this instance, the sum of vibration components Gt is less than a predetermined threshold value $Gt_{30}$, the computer 107 determines a "No" answer at step 640 and maintains the spring coefficient KN in the set value. If the sum of vibration components Gt is more than the threshold value $Gt_{30}$, the computer 107 executes processing at step 640 and 642 to set a spring coefficient $KG_3$ as a value to be decreased in accordance with an increase of the sum of vibration components Gt. Thereafter, the computer 107 executes processing at step 644 and 646 to change the spring coefficient KV to the spring coefficient $KG_3$ if the latter coefficient KG3 is smaller than the former coefficient KV.

Figure 25:
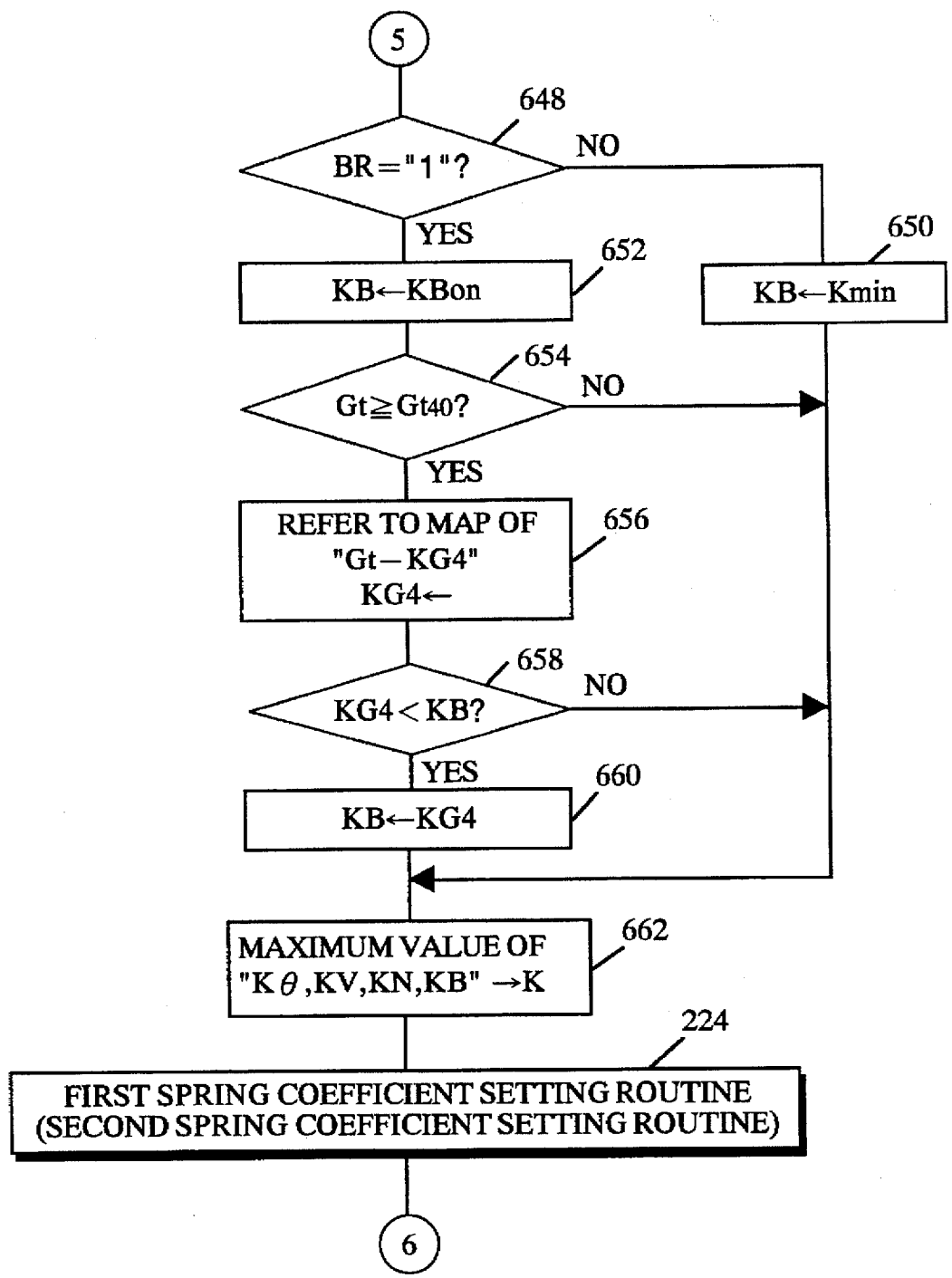
FIG. 25 is a flow chart of a fourth part of the control program.
Figure 26:
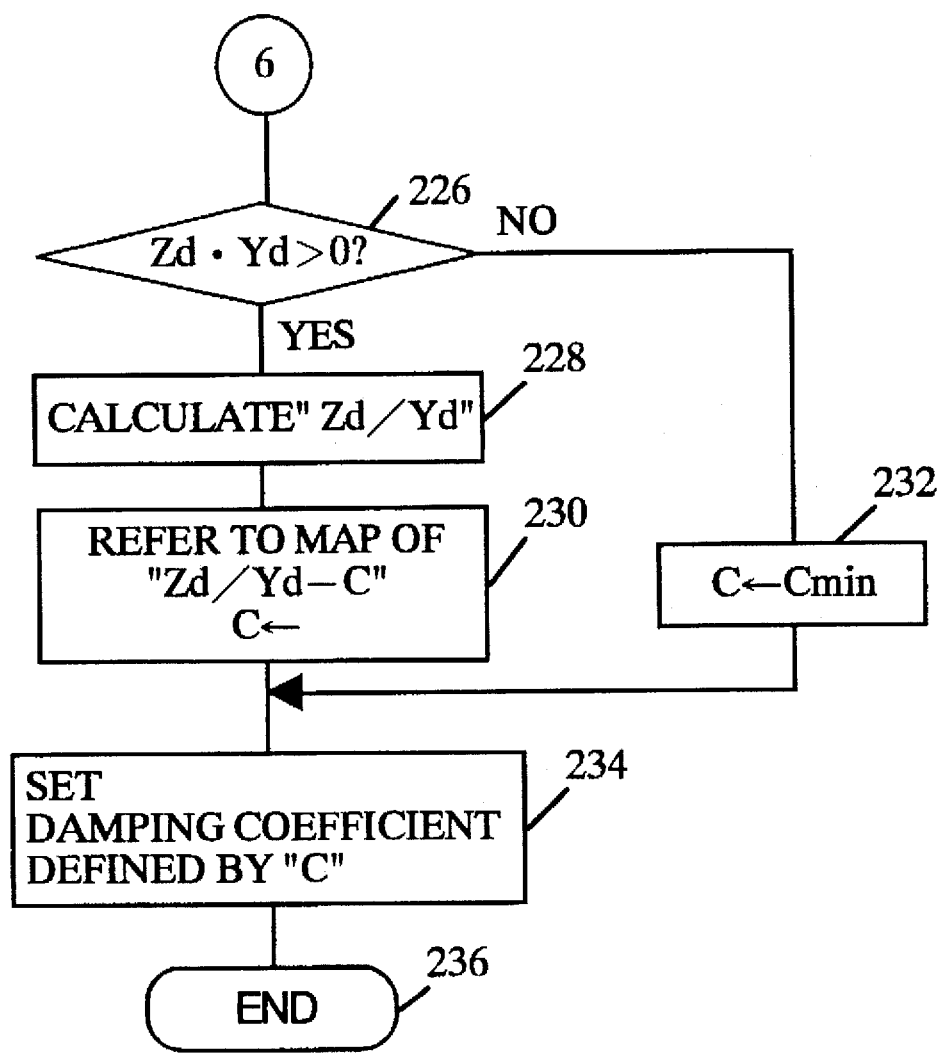
FIG. 26 is a flow chart of a final part of the control program.
Figure 33:
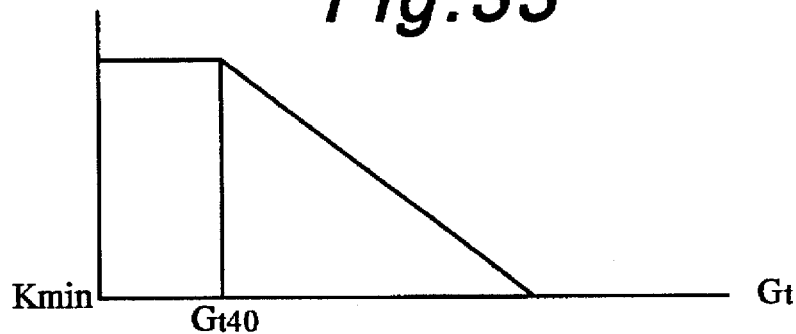
FIG. 33 is a map of Gt–$KG_4$ showing a spring coefficient $KG_4$ in relation to a vibration component Gt.
Figure 34:
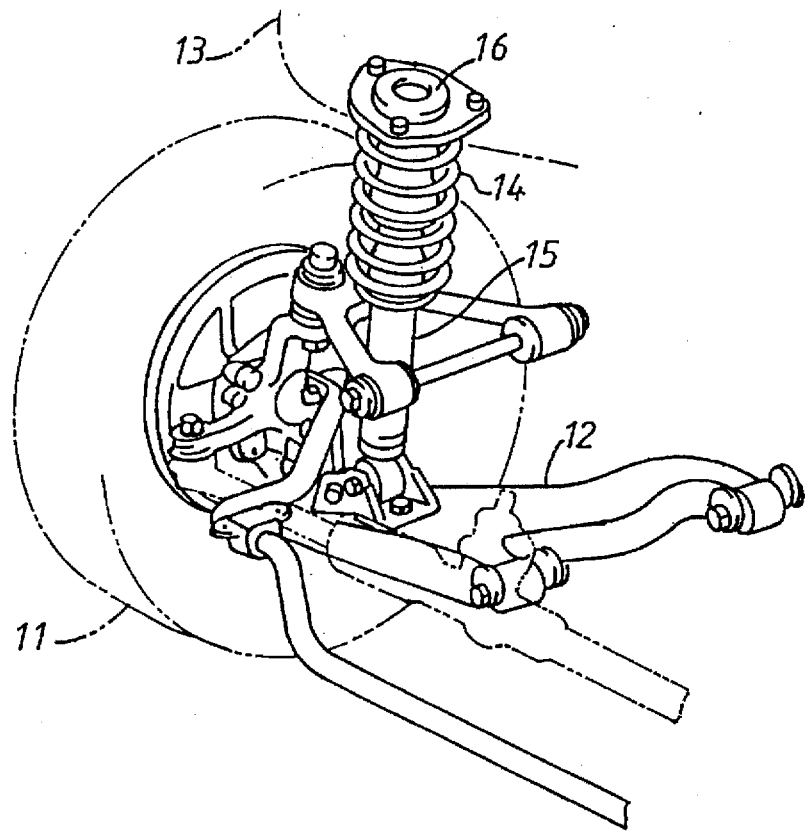
FIG. 34 is a perspective view of a conventional suspension system of an automotive vehicle.
Figure 35:
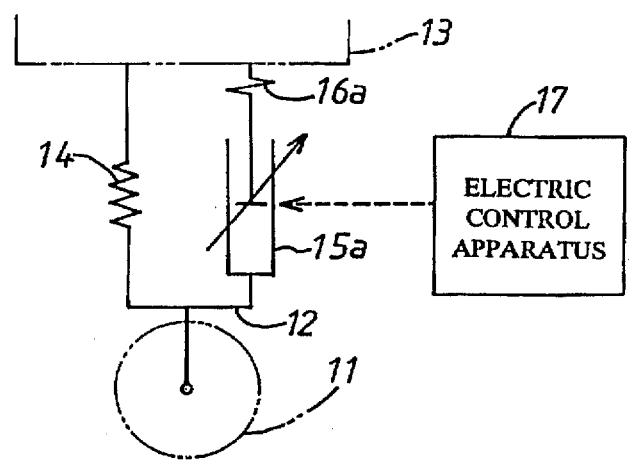
FIG. 35 is a conceptual view equivalent to the suspension system shown in FIG. 34.

Subsequently, the computer 107 determines a spring coefficient KB related to depression of the brake pedal or deceleration of the vehicle by processing at step 648–660 shown in FIG. 25. If the brake switch 125 is opened in a released condition of the brake pedal, the computer 107 executes processing at step 648 and 650 to set the spring coefficient KB to a predetermined minimum spring coefficient Kmin. When the brake switch 125 is closed by depression of the brake pedal, the computer 107 executes processing at step 648 and 652 to temporarily set the spring coefficient KB as a predetermined value KBon (>Kmin). If in this instance the sum of vibration components Gt is less than a predetermined threshold value $Gt_{40}$, the computer 107 determines a "No" answer at step 654 and maintains the spring coefficient KB in the temporarily set value. If the sum of vibration components Gt is more than the threshold value $Gt_{40}$, the computer 107 executes processing at step 654 and 656 to set a spring coefficient $KG_4$ as a value to be decreased in accordance with an increase of the sum of vibration components Gt, with reference to a map of Gt–$KG_4$ shown in FIG. 33. Thereafter, the computer 107 executes processing at step 658 and 660 to change the spring coefficient KB to the spring coefficient $KG_4$ if the latter coefficient KG4 is smaller than the former coefficient KB.

When the program proceeds to step 662, the computer 107 sets a maximum value of the spring coefficients Kθ, KV, KN, KB as a target spring coefficient "K". After setting the target spring coefficient "K", the computer 107 executes at step 224 the first or second spring coefficient setting routine as in the preferred embodiment to render the spring coefficient of the spring element in the suspension system identical with the target spring coefficient "K". Thus, the computer 107 executes processing at step 226–234 in FIG. 26 as in the preferred embodiment to adjust the damping coefficient of the damping force generating mechanism in the damper device 40 to the target damping coefficient "C" determined on a basis of the skyhook theory.

As is understood from the above description, driving operation of the vehicle causing an attitude change of the sprung mass such as "roll", "dive" or "squat" is detected by the steering angle sensor 121, rotation sensor 124 of the prime engine and brake switch 125, and the magnitude of the driving operation is determined by processing at step 606, 634 and 648. When the magnitude of the driving operation is large, processing at step 606, 634 and 648 is executed to determine the spring coefficients Kθ, KN, KB to be increased in accordance with an increase of the magnitude of the driving operation. When the magnitude of the driving operation is small, processing at step 608, 636 and 650 is executed to set the spring coefficients Kθ, KN, KB respectively to a small value. In addition, the traveling speed V of the vehicle is detected by the vehicle speed sensor 123 and determined by processing at step 620. When the traveling speed V is high, processing at step 624 is executed to determine the spring coefficient KV to be increased in accordance with an increase of the traveling speed V. When the traveling speed V is low, processing at step 622 is executed to set the spring coefficient KV to a small value. Thus, processing at step 626 and 224 is executed to adjust the spring coefficient of the spring element to a maximum value of the spring coefficients Kθ, KN, KB, KV.

Accordingly, the spring coefficient of the spring element is increased when operating condition of the damping force control mechanism (42, 43, 45a, 45b or 46) is detected by processing at step 606, 634 and 648. As a result, the spring element cooperates with the damping force generating mechanism to efficiently dampen the vibration of the sprung mass of the vehicle. Since the spring coefficient of the spring element is increased during high speed traveling of the vehicle, the spring element cooperates with the damping force generating mechanism to efficiently transfer the damping force to the sprung mass of the vehicle even when the vehicle is turned by steering operation.

In the second modification, the processing at step 604 is executed to calculate the vibration components Gt of the sprung mass in the frequency region other than the resonant frequency regions of the sprung and unsprung masses, and the processing at step 612–818, 626–632, 640–646 and 654–680 is executed to restrict the upper limits of the spring coefficients Kθ, KN, KB, KV If the vibration component Gt is large. This is useful to restrain the spring coefficient of the spring element to a small value when the vibration component Gt becomes large. Although in the second modification, the rotation sensor 124 has been adapted to detect acceleration of the vehicle, an acceleration sensor for detecting forward acceleration of the vehicle or an accelerator sensor for detecting a depression amount of the accelerator pedal of the vehicle may be adapted instead of the rotation sensor 124. The brake switch 125 may be also replaced with the acceleration sensor.

What is claimed is:

1. A suspension system of an automotive vehicle including a spring disposed between an unsprung mass and a sprung mass for resiliently supporting the sprung mass thereon and a damping force generating mechanism arranged in parallel with said spring for absorbing vibration of the sprung mass relative to the unsprung mass, wherein the suspension system comprises resilient means disposed in series with said damping force generating mechanism between said unsprung and sprung masses and an electrically operated control mechanism for controlling a spring coefficient of said resilient means.

2. A suspension system as claimed in claim 1, wherein said resilient means is disposed between said damping force generating mechanism and said sprung mass.

3. A suspension system as claimed in claim 1, wherein said resilient means is disposed between said damping force generating mechanism and said unsprung mass.

4. A suspension system of an automotive vehicle including a spring disposed between an unsprung mass and a sprung mass for resiliently supporting the sprung mass thereon, a damper device including a damping force generating mechanism composed of a hydraulic cylinder mounted on said unsprung mass, a piston disposed within said cylinder to subdivide the interior of said cylinder into upper and lower fluid chambers, a piston rod connected at its lower end to said piston and extending upwards from an upper end of said cylinder, and valve means assembled with said piston to control the flow of hydraulic fluid between the upper and lower fluid chambers in response to movement of said piston, Wherein the suspension system comprises a plurality of springs disposed between an upper end of said piston rod and said sprung mass and arranged in series with said damping force generating mechanism of said damper device, and an electrically operated control mechanism for selectively effecting spring action of said plurality of springs.

5. A suspension system of an automotive vehicle including a spring disposed between an unsprung mass and a sprung mass for resiliently supporting thereon the sprung mass and a damper device including a damping force generating mechanism composed of a hydraulic cylinder mounted on said unsprung mass, a piston disposed within said cylinder to subdivide the interior of said cylinder into upper and lower fluid chambers, a piston rod connected at its lower end to said piston and extending upwards from an upper end of said cylinder, and valve means assembled with said piston to control the flow of hydraulic fluid between the upper and lower fluid chambers in response to movement of said piston, wherein the suspension system comprises a resilient block member disposed between an upper end of said piston rod and said sprung mass, said resilient block member being formed with an internal cavity to be supplied with hydraulic fluid, and an electrically operated control mechanism for controlling an amount of hydraulic fluid supplied into the internal cavity of said resilient block member.

6. A suspension system of an automotive vehicle including a spring disposed between an unsprung mass and a sprung mass for resiliently supporting thereon the sprung mass and a damper device including a damping force generating mechanism composed of a hydraulic cylinder mounted on said unsprung mass, a piston disposed within said cylinder to subdivide the interior of said cylinder into upper and lower fluid chambers, a piston rod connected at its lower end to said piston and extending upwards from an upper end of said cylinder, and valve means assembled with said piston to control the flow of hydraulic fluid between the upper and lower fluid chambers in response to movement of said piston, wherein the suspension system comprises means for introducing atmospheric air into the hydraulic fluid stored in said hydraulic cylinder and an electrically operated control mechanism for controlling an amount of the air introduced into the hydraulic fluid in said cylinder.

7. A suspension system of an automotive vehicle including a spring disposed between an unsprung mass and a sprung mass for resiliently supporting the sprung mass thereon, a damper device including a damping force generating mechanism composed of a hydraulic cylinder mounted on said unsprung mass, a piston-disposed within said cylinder to subdivide the interior of said cylinder into upper and lower fluid chambers, a piston rod connected at its lower end to said piston and extending upwards from an upper end of said cylinder and valve means assembled with said piston to control the flow of hydraulic fluid between the upper and lower fluid chambers in response to movement of said piston and including a free piston disposed within a lower end portion of said cylinder to form a gas chamber isolated from the lower fluid chamber in a liquid-tight manner, wherein the suspension system comprises an electrically operated control mechanism arranged to control the pressure of gaseous medium introduced into and discharged from the gas chamber of said damper device.

8. An electric control apparatus for a suspension system including a spring disposed between an unsprung mass and a sprung mass for resiliently supporting the sprung mass thereon, a damping force generating mechanism arranged in parallel with said spring for absorbing vibration of the sprung mass relative to the unsprung mass, resilient means disposed in series with said damping force generating mechanism between the unsprung and sprung masses, and an electrically operated control mechanism for controlling a spring coefficient of said resilient means, wherein the electric control apparatus comprises detection means for detecting damping action of said damping force generating mechanism and for producing an electric signal indicative of the damping action, and control means responsive to the electric signal from said detection means for controlling said electrically operated control mechanism in such manner that the spring coefficient of said resilient means is increased in response to the damping action of said damping force generating mechanism.

9. An electric control apparatus for a suspension system of an automotive vehicle including a spring disposed between an unsprung mass and a sprung mass for resiliently supporting thereon the sprung mass, a damping force generating mechanism arranged in parallel with said spring for absorbing vibration of the sprung mass relative to the unsprung mass, resilient means disposed in series with said damping force generating mechanism between the unsprung and sprung masses, and an electrically operated control mechanism for controlling a spring coefficient of said resilient means, wherein the electric control apparatus comprises detection means for detecting vibration of said sprung mass and for producing an electric signal indicative of the magnitude of vibration of said sprung mass, and control means responsive to the electric signal from said detection means for controlling said electrically operated control mechanism in such a manner that the spring coefficient of said resilient means is increased in accordance with an increase of the vibration of said sprung mass.

10. An electric control apparatus as claimed in claim 9, wherein said detection means comprises means for detecting vibration of said sprung mass in a specific frequency region.

11. An electric control apparatus for a suspension system of an automotive vehicle including a spring disposed between an unsprung mass and a sprung mass for resiliently supporting thereon the sprung mass, a damping force generating mechanism arranged in parallel with said spring for absorbing vibration of the sprung mass relative to the unsprung mass, resilient means disposed in series with said damping force generating mechanism between the unsprung and sprung masses, and an electrically operated control mechanism for controlling a spring coefficient of said resilient means, wherein the electric control system comprises detection means for detecting driving operation of the vehicle during which an attitude of said sprung mass is changed and for producing an electric signal indicative of the detected driving operation of the vehicle, and control means responsive to the electric signal from said detection means for controlling said electrically operated control mechanism in such a manner that the spring coefficient of said resilient means is increased in response to the driving operation of the vehicle.

12. An electric control apparatus for a suspension system of an automotive vehicle including a spring disposed between an unsprung mass and a sprung mass for resiliently supporting thereon the sprung mass, a damping force generating mechanism arranged in parallel with said spring for absorbing vibration of the sprung mass relative to the unsprung mass, resilient means disposed in series with said damping force generating mechanism between the unsprung and sprung masses, and an electrically operated control mechanism for controlling a spring coefficient of said resilient means, wherein the electric control apparatus comprises detection means for detecting a traveling speed of the vehicle and for producing an electric signal indicative of the detected traveling speed, and control means responsive to the electric signal from said detection means for controlling said electrically operated control mechanism in such a manner that the spring coefficient is increased in accordance with an increase of the traveling speed.

13. An electric control apparatus for a suspension system of an automotive vehicle including a spring disposed between an unsprung mass and a sprung mass for resiliently supporting the sprung mass thereon, a damping force generating mechanism arranged in parallel with said spring for absorbing vibration of the sprung mass relative to the unsprung mass, resilient means disposed in series with said damping force generating mechanism between the unsprung and sprung masses, and an electrically operated control mechanism for controlling a spring coefficient of said resilient means, wherein the electric control apparatus comprises:
means for producing a control signal indicative of a target spring coefficient and for applying the control signal to said electrically operated control mechanism thereby to set the spring coefficient of said resilient means to the target spring coefficient, detection means for detecting a vibration component of said sprung mass distributed between resonant frequencies of said sprung and unsprung masses and for producing an electric signal indicative of the detected vibration component; and restriction means responsive to the electric signal from said detection means for restricting the target spring coefficient to a small value when the detected vibration component is large.

14. An electric control apparatus for a suspension system of an automotive vehicle including a spring disposed between an unsprung mass and a sprung mass for resiliently supporting the sprung mass thereon, a damping force generating mechanism arranged in parallel with said spring for absorbing vibration of the sprung mass relative to the unsprung mass, resilient means disposed in series with said damping force generating mechanism between the unsprung and sprung masses, and an electrically operated control mechanism for controlling a spring coefficient of said resilient means, wherein the electric control apparatus comprises:
means for applying a changeover signal to said electrically operated control mechanism;
detection means for detecting a relative vertical displacement velocity of said sprung mass to said unsprung mass and for producing an electric signal indicative of the detected relative vertical displacement velocity; and
means responsive to the electric signal from said detection means for applying a changeover signal to said electrically operated control mechanism when the detected relative vertical displacement velocity has become approximately zero.

15. An electric control apparatus for a suspension system of an automotive vehicle including a spring disposed between an unsprung mass and a sprung mass for resiliently supporting thereon the sprung mass, a damping force generating mechanism arranged in parallel with said spring for absorbing vibration of the sprung mass relative to the unsprung mass, resilient means disposed in series with said damping force generating mechanism between the unsprung and sprung masses, and an electrically operated control mechanism for controlling a spring coefficient of said resilient means, wherein the electric control apparatus comprises control means for controlling said electrically operated control mechanism in such a manner that the spring coefficient of said resilient means is gradually switched over.

16. A suspension system of an automotive vehicle comprising:
a spring disposed between an unsprung mass and a sprung mass for resiliently supporting thereon the sprung mass;
a damping force generating mechanism arranged in parallel with said spring for absorbing vibration of the sprung mass relative to the unsprung mass;
resilient means disposed in series with said damping force generating mechanism between the unsprung and sprung masses;
an electrically operated damping force control mechanism for controlling a damping coefficient of said damping force generating mechanism;
an electrically operated spring coefficient control mechanism for controlling a spring coefficient of said resilient means; and
control means for controlling said damping force control mechanism and said spring coefficient control mechanism.

17. An electric control apparatus for a suspension system of an automotive vehicle including a spring disposed between an unsprung mass and a sprung mass for resiliently supporting the sprung mass thereon, a damping force generating mechanism arranged in parallel with said spring for absorbing vibration of the sprung mass relative to the unsprung mass, resilient means disposed in series with said damping force generating mechanism between the unsprung and sprung masses, an electrically operated damping force control mechanism for controlling a damping coefficient of said damping force generating mechanism; and an electrically operated spring coefficient control mechanism for controlling a spring coefficient of said resilient means, wherein the electric control apparatus comprises:
first detection means for detecting vibration of said sprung mass;
second detection means for detecting vibration of said sprung mass in a specific frequency region;
first control means for controlling said electrically operated damping force control mechanism in such a manner that the damping coefficient is increased in accordance with an increase of the vibration of said sprung mass detected by said first detection means;
second control means for controlling said electrically operated spring coefficient control mechanism in such a manner that the spring coefficient of said resilient means is increased in accordance with an increase of the vibration of said sprung mass detected by said second detection means.

18. An electric control apparatus as claimed in claim 17, wherein the specific frequency region corresponds with either one of resonant frequencies of said sprung and unsprung masses.

19. An electric control apparatus for a suspension system of an automotive vehicle including a spring disposed between an unsprung mass and a sprung mass for resiliently supporting the sprung mass thereon, a damping force generating mechanism arranged in parallel with said spring for absorbing vibration of the sprung mass relative to the unsprung mass, resilient means disposed in series with said damping force generating mechanism between the unsprung and sprung masses, an electrically operated damping force control mechanism for controlling a damping coefficient of said damping force generating mechanism, and an electrically operated spring coefficient control mechanism for controlling a spring coefficient of said resilient means, wherein the electric control apparatus comprises:
a sensor for detecting vibration of said sprung mass;
first control means for controlling said damping force control mechanism in such a manner that the damping coefficient of said damping force generating mechanism is increased in accordance with an increase of a vibration component of said sprung mass detected by said sensor in a low frequency region and that the damping coefficient is decreased in accordance with a decrease of the vibration component; and
second control means for controlling said spring coefficient control mechanism in such a manner that the spring coefficient of said resilient means is increased in accordance with an increase of vibration of said sprung mass detected by said sensor in a specific frequency region and that the spring coefficient of said resilient means is decreased in another condition.

20. An electric control apparatus as claimed in claim 19, wherein the specific frequency region of vibration of said sprung mass corresponds with either one of resonant frequencies of said sprung and unsprung masses.

21. An electric control apparatus for a suspension system of an automotive vehicle including a spring disposed between an unsprung mass and a sprung mass for resiliently supporting the sprung mass thereon, a damping force generating mechanism arranged in parallel with said spring for absorbing vibration of the sprung mass relative to the unsprung mass, resilient means disposed in series with said damping force generating mechanism between the unsprung and sprung masses, an electrically operated damping force control mechanism for controlling a damping coefficient of said damping force generating mechanism, and an electrically operated spring coefficient control mechanism for controlling a spring coefficient of said resilient means, wherein the electric control apparatus comprises:
detection means for detecting vibration of said sprung mass;
first control means for controlling said damping force control mechanism in such a manner that when a vibration component corresponding with a resonant frequency of said sprung mass is large, the damping coefficient of said damping force generating mechanism is set as a first value to be increased in accordance with an increase of vibration of said sprung mass, that when a vibration component corresponding with a resonant frequency of said unsprung mass is large, the damping coefficient of said damping force generating mechanism is set to a second small value, and that when a vibration component corresponding with each resonant frequency of said unsprung and sprung masses is small, the damping coefficient is set to a third smaller value than the second small value; and
second control means for controlling said spring coefficient control mechanism in such a manner that the spring coefficient of said resilient means is increased in accordance with an increase of vibration of said sprung mass corresponding with each resonant frequency of said sprung and unsprung masses.

\* \* \* \* \*